US012283591B2

(12) United States Patent
Xian et al.

(10) Patent No.: US 12,283,591 B2
(45) Date of Patent: *Apr. 22, 2025

(54) INTEGRATED CIRCUIT DEVICE

(71) Applicants: TAIWAN SEMICONDUCTOR MANUFACTURING COMPANY, LTD., Hsinchu (TW); TSMC NANJING COMPANY, LIMITED, Jiangsu (CN)

(72) Inventors: Huaixin Xian, Hsinchu (TW); Yang Zhou, Hsinchu (TW); Qingchao Meng, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,460

(22) Filed: Nov. 27, 2023

(65) Prior Publication Data

US 2024/0088129 A1    Mar. 14, 2024

Related U.S. Application Data

(63) Continuation of application No. 17/338,038, filed on Jun. 3, 2021, now Pat. No. 11,862,621.

(30) Foreign Application Priority Data

May 20, 2021  (CN) .................. 202110549726.0

(51) Int. Cl.
*H01L 23/528*    (2006.01)
*G06F 30/392*    (2020.01)
(Continued)

(52) U.S. Cl.
CPC ........ *H01L 27/0207* (2013.01); *G06F 30/392* (2020.01); *H01L 21/823871* (2013.01);
(Continued)

(58) Field of Classification Search
CPC ............ H01L 27/0207; H01L 23/5286; H01L 27/092
See application file for complete search history.

(56) References Cited

U.S. PATENT DOCUMENTS 7,260,442 B2    8/2007    Hwang et al.
9,256,709 B2    2/2016    Yu et al.
(Continued)

FOREIGN PATENT DOCUMENTS

TW    201526191    7/2015

*Primary Examiner* — Walter H Swanson
(74) *Attorney, Agent, or Firm* — Hauptman Ham, LLP

(57) ABSTRACT

An integrated circuit (IC) device includes at least one circuit having an input and an output, and an output connector electrically coupled to the output. The circuit further includes a plurality of transistors electrically coupled with each other between the input and the output. The output is in a first metal layer. The output connector includes a first conductive pattern in the first metal layer, and a second conductive pattern in a second metal layer different from the first metal layer. The second conductive pattern electrically couples the output to the first conductive pattern.

20 Claims, 24 Drawing Sheets

(51) Int. Cl.
*H01L 21/8238* (2006.01)
*H01L 27/02* (2006.01)
*H01L 27/092* (2006.01)
*G06F 119/12* (2020.01)

(52) U.S. Cl.
CPC ........ *H01L 23/5286* (2013.01); *H01L 27/092* (2013.01); *G06F 2119/12* (2020.01)

(56) References Cited

U.S. PATENT DOCUMENTS

| | | |
|---|---|---|
| 2005/0212013 A1 | 9/2005 | Takeda et al. |
| 2009/0190385 A1 | 7/2009 | Kim |
| 2013/0021107 A1 | 1/2013 | Poppe et al. |
| 2014/0040838 A1 | 2/2014 | Liu et al. |
| 2015/0278429 A1 | 10/2015 | Chang |
| 2018/0322233 A1* | 11/2018 | Jung .................. G06F 30/3315 |

* cited by examiner

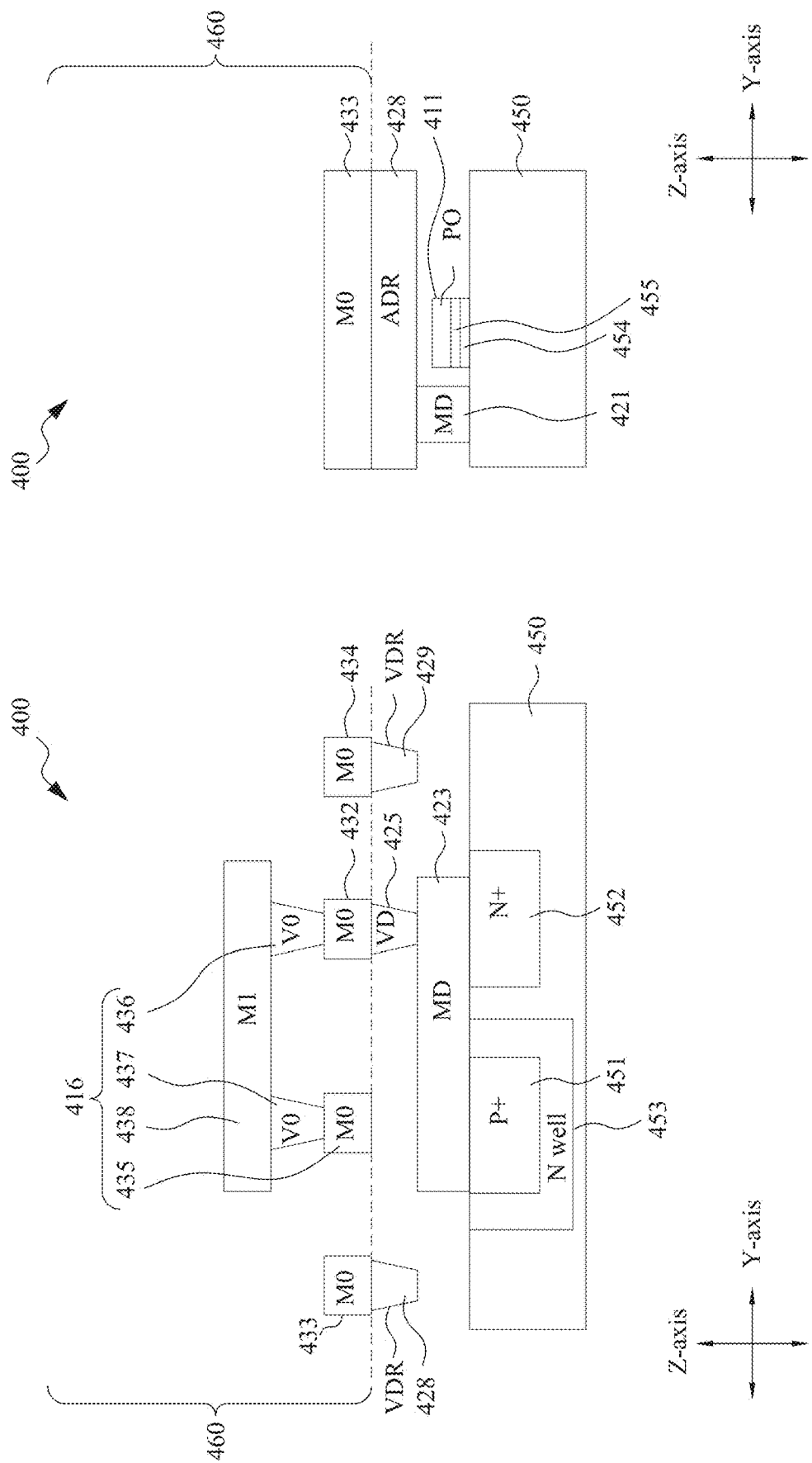

INTEGRATED CIRCUIT DEVICE

RELATED APPLICATION(S)

The instant application is a continuation application of U.S. patent application Ser. No. 17/338,038, filed Jun. 3, 2021, now U.S. Pat. No. 11,862,621, issued on Jan. 2, 2024, which claims the priority of China Application No. 202110549726.0, filed May 20, 2021. The entireties of the above-referenced patent(s) and applications are incorporated by reference herein.

BACKGROUND

An integrated circuit ("IC") device includes one or more semiconductor devices represented in an IC layout diagram (also referred to as a "layout diagram"). A layout diagram is hierarchical and includes modules which carry out higher-level functions in accordance with the semiconductor device design specifications. The modules are often built from a combination of cells, each of which represents one or more semiconductor structures configured to perform a specific function. Cells having pre-designed layout diagrams, sometimes known as standard cells, are stored in standard cell libraries (hereinafter "libraries" or "cell libraries" for simplicity) and accessible by various tools, such as electronic design automation (EDA) tools, to generate, optimize and verify designs for ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A is a schematic cross-sectional view, taken along line IV-IV in FIG. 3A, of an IC device, in accordance with some embodiments.

FIG. 4B is a schematic cross-sectional view, taken along line IV'-IV' in FIG. 3A, of an IC device, in accordance with some embodiments.

DETAILED DESCRIPTION

Figures 1, 2A:
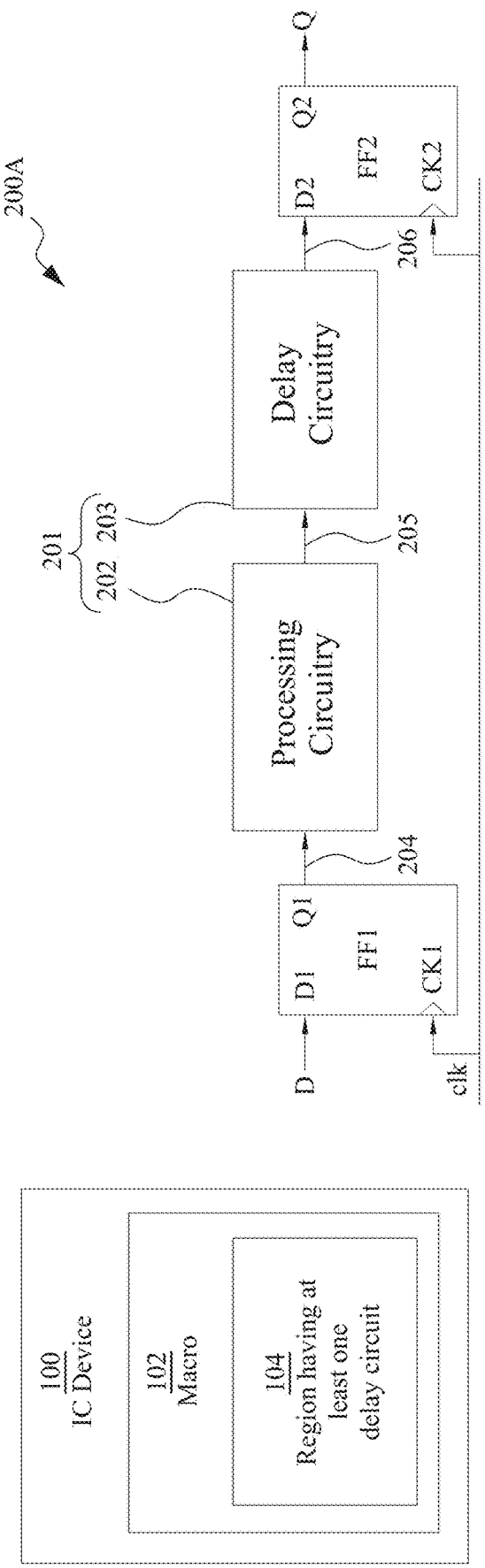
FIG. 1 is a block diagram of an IC device, in accordance with some embodiments.
FIG. 2A is a schematic block diagram of a circuit region of an IC device, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A delay circuit is included in an IC device to delay a signal for satisfying one or more timing and/or operational requirements. In some embodiments in accordance with a first aspect, an output connector is electrically coupled to an output of a delay circuit. As a result, in at least one embodiment, resistance and/or capacitance associated with the output connector impart(s) a further delay to the delayed signal. In some embodiments in accordance with a second aspect, a delay circuit comprises N-type and P-type transistors correspondingly formed over N-type and P-type active regions. One of the N-type and P-type active regions is a continuous active region, whereas the other of the N-type and P-type active regions is a discontinuous active region. As a result, in at least one embodiment, a saturation current of N-type or P-type transistors over the discontinuous active region is degraded, which, in turn, increases the delay and/or delay circuit/cell efficiency. In some embodiments in accordance with a third aspect, at least one via structure is arranged over and in electrical contact with a gate electrode of a transistor in a delay circuit, but is not electrically coupled to any another circuit element. The at least one via structure is further over an active region associated with the transistor. As a result, in at least one embodiment, a threshold voltage of the transistor is increased which, in turn, increases the delay and/or delay circuit/cell efficiency. Some embodiments include features corresponding to more than one, or all, of the first through third aspects. As a result, in at least one embodiment, advantages corresponding to more than one, or all, of the first through third aspects are achievable.

FIG. 1 is a block diagram of an IC device 100, in accordance with some embodiments.

In FIG. 1, the IC device 100 comprises, among other things, a macro 102. In some embodiments, the macro 102 comprises one or more of a memory, a power grid, a cell or cells, an inverter, a latch, a buffer and/or any other type of circuit arrangement that may be represented digitally in a cell library. In some embodiments, the macro 102 is understood in the context of an analogy to the architectural hierarchy of modular programming in which subroutines/procedures are called by a main program (or by other subroutines) to carry out a given computational function. In this context, the IC device 100 uses the macro 102 to perform one or more given functions. Accordingly, in this context and in terms of architectural hierarchy, the IC device 100 is analogous to the main program and the macro 102 is analogous to subroutines/procedures. In some embodiments, the macro 102 is a soft macro. In some embodiments, the macro 102 is a hard macro. In some embodiments, the macro 102 is a soft macro which is described digitally in register-transfer level (RTL) code. In some embodiments, synthesis, placement and routing have yet to have been performed on the macro 102 such that the soft macro can be synthesized, placed and routed for a variety of process nodes. In some embodiments, the macro 102 is a hard macro which is described digitally in a binary file format (e.g., Graphic Database System II (GDSII) stream format), where the binary file format represents planar geometric shapes, text labels, other information and the like of one or more layout-diagrams of the macro 102 in hierarchical form. In some embodiments, synthesis, placement and routing have been performed on the macro 102 such that the hard macro is specific to a particular process node.

The macro 102 includes a region 104 which comprises at least one delay circuit as described herein. In some embodiments, the region 104 comprises a semiconductor substrate having circuitry formed thereon, in a front-end-of-line (FEOL) fabrication. Furthermore, above and/or below the semiconductor substrate, the region 104 comprises various metal layers that are stacked over and/or under insulating layers in a Back End of Line (BEOL) fabrication. The BEOL provides routing for circuitry of the IC device 100, including the macro 102 and the region 104.

FIG. 2A is a schematic block diagram of a circuit region 200A of an IC device, in accordance with some embodiments. In at least one embodiment, the circuit region 200A corresponds to a portion of the region 104 in FIG. 1.

In the example configuration in FIG. 2A, the circuit region 200A comprises flip-flops FF1, FF2, and a signal path 201 between the flip-flops FF1, FF2. The signal path 201 comprises processing circuitry 202, and delay circuitry 203. The flip-flop FF1 comprises an input D1 electrically coupled to receive input data D, an output Q1 electrically coupled to an input of the processing circuitry 202, and a clock input CK1 electrically coupled to receive a clock signal clk. The flip-flop FF2 comprises an input D2 electrically coupled to an output of the delay circuitry 203, an output Q2, and a clock input CK2 electrically coupled to receive the clock signal clk. An output of the processing circuitry 202 is electrically coupled to an input of the delay circuitry 203. Examples of one or more circuits, logics, or cells included in the processing circuitry 202 include, but are not limited to, AND, OR, NAND, NOR, XOR, INV, OR-AND-Invert (OAI), MUX, Flip-flop, BUFF, Latch, delay, clock, memory, or the like. Examples of delay circuitry 203 are described herein. Other configurations for processing circuitry and/or delay circuitry are within the scopes of various embodiments.

The flip-flop FF1 is configured to latch the received input data D and output the latched input data D as a signal 204 to the processing circuitry 202 in synchronization with active clock edges (e.g., rising edges or falling edges) of clock pulses in the clock signal clk. The processing circuitry 202 is configured perform data processing, e.g., one or more logic operations, on the latched input data D in the signal 204 received from the flip-flop FF1, and output processed data in a signal 205 to the delay circuitry 203. The delay circuitry 203 is configured to add a time delay to the signal 205, and output a delayed signal 206 to the flip-flop FF2. The flip-flop FF2 is configured to latch the processed data in the received delayed signal 206 and output the latched processed data as output data Q to other circuitry in the IC device, or to external circuitry outside the IC device, in synchronization with active clock edges in the clock signal clk.

In some situations, for a stable operation of the flip-flop FF2, there is a requirement that the signal at the input D2 is stable, e.g., not changing between a high level and a low level, during a predetermined time period around an active clock edge of the clock signal clk. Such a predetermined time period includes a setup time and a hold time. The setup time is a predetermined minimum amount of time required for the signal at the input D2 to be stable before an active clock edge. The hold time is a predetermined minimum amount of time required for the signal at the input D2 to be stable after an active clock edge. In an IC design stage, a timing analysis is performed for the processing circuitry 202 electrically coupled between the flip-flops FF1, FF2. If the timing analysis indicates a hold time violation at the flip-flop FF2, an approach to correct such a timing error, in at least one embodiment, is to insert delay circuitry 203 between the processing circuitry 202 and the flip-flop FF2. In some embodiments, the delay circuitry 203 comprises one or more delay cells, each including one or more delay circuits. The time delay added by the delay circuitry 203 to the signal 205 is selectable or adjustable by a configuration and/or a number of delay cells or delay circuits in the delay circuitry 203. Other applications for delay cells or delay circuits are within the scopes of various embodiments.

Figure 2B:
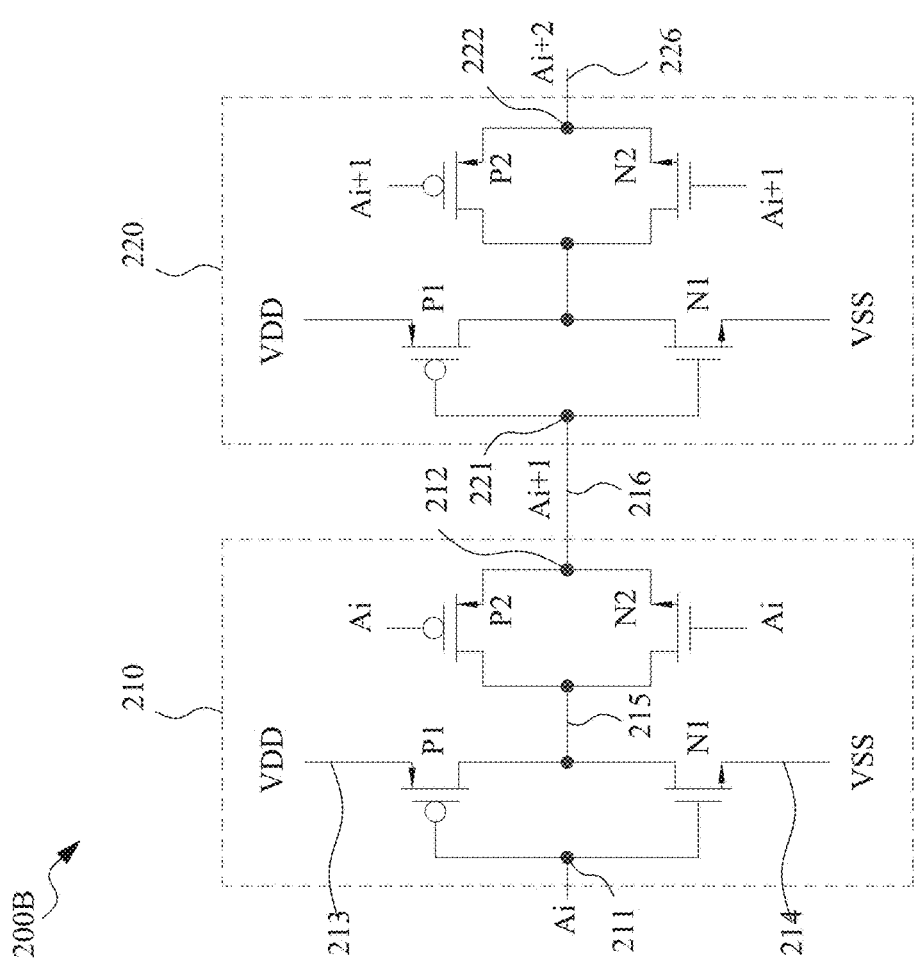
FIG. 2B is a schematic circuit diagram of a circuit region of an IC device, in accordance with some embodiments.

FIG. 2B is a schematic circuit diagram of delay circuitry 200B in a circuit region of an IC device, in accordance with some embodiments. In at least one embodiment, the delay circuitry 200B corresponds to the delay circuitry 203 in FIG. 2A.

In the example configuration in FIG. 2B, the delay circuitry 200B comprises delay circuits 210, 220 electrically coupled in series, so that a time delay of the delay circuit 210 is added to a time delay of the delay circuit 220, resulting in a greater time delay required for correcting a timing error in one or more situations. The number of delay circuits in the delay circuitry 200B is not limited to two. For example, in at least one embodiment, one delay circuit 210 or 220 in the delay circuitry 200B is sufficient to provide a required time delay. In one or more embodiments, the delay circuitry 200B comprises more than two delay circuits to obtain a greater required time delay. The delay circuits in the delay circuitry 200B are electrically coupled in series, with an output of a preceding delay circuit being electrically coupled to an input of a succeeding delay circuit, as described with respect to the delay circuits 210, 220.

The delay circuit 210 comprises an input 211, an output 212, and a plurality of transistors P1, P2, N1, N2 electrically coupled together to delay an input signal Ai received at the input 211 to generate a delayed signal Ai+1 at the output 212. Examples of transistors in the delay circuit 210 include, but are not limited to, metal oxide semiconductor field effect transistors (MOSFET), complementary metal oxide semiconductors (CMOS) transistors, P-channel metal-oxide semiconductors (PMOS), N-channel metal-oxide semiconductors (NMOS), bipolar junction transistors (BJT), high voltage transistors, high frequency transistors, P-channel and/or N-channel field effect transistors (PFETs/NFETs), FinFETs, planar MOS transistors with raised source/drains, nanosheet FETs, nanowire FETs, or the like. In the example configuration in FIG. 2B, the delay circuit 210 comprises PMOS transistors P1, P2, and NMOS transistors N1, N2. In some embodiments, a PMOS transistor is referred to as a transistor of a first or second type, and an NMOS transistor is referred to as a transistor of the second or first type.

Gates of all transistors P1, P2, N1, N2 are electrically coupled to the input 211 to receive the signal Ai. For simplicity, internal connections between the gates of transistors P2, N2 and the input 211 are omitted. The transistors P1 and N1 are electrically coupled in series between a first node 213 of a first power supply voltage, e.g., VDD, and a second node 214 of a second power supply voltage, e.g., VSS. For simplicity, the first node 213 and corresponding nodes or power rails having the first power supply voltage are referred to as "VDD," and the second node 214 and corresponding nodes or power rails having the second power supply voltage are referred to as "VSS." A source/drain of the transistor P1 and a source/drain of the transistor N1 are electrically coupled to a third node 215, the other source/drain of the transistor P1 is electrically coupled to VDD, and the other source/drain of the transistor N1 is electrically coupled to VSS. The transistors P2 and N2 are electrically coupled in parallel between the third node 215 and the output 212. A source/drain of the transistor P2 and a source/drain of the transistor N2 are electrically coupled to the third node 215, and the other source/drain of the transistor P2 and the other source/drain of the transistor N2 are electrically coupled to the output 212. The described circuit configuration of the delay circuit 210 is an example. Other delay circuit configurations are within the scopes of various embodiments.

The delay circuit 220 comprises an input 221, an output 222, and a plurality of transistors P1, P2, N1, N2 electrically coupled together as in the delay circuit 210. The input 221 of the delay circuit 220 is electrically coupled to the output 212 of the delay circuit 210 through an output connector 216 to receive the signal Ai+1 output by the delay circuit 210. The output 222 is electrically coupled to an output connector 226. The plurality of transistors P1, P2, N1, N2 are electrically coupled together to delay the signal Ai+1 received at the input 221 to generate a further delayed signal Ai+2 at the output 222. In the example configuration in FIG. 2B, the delay circuit 220 has the same circuit configuration as the delay circuit 210. In some embodiments, the delay circuit 220 has a circuit configuration different from the circuit configuration of the delay circuit 210. The delay circuit 210 is an example of a preceding delay circuit and the delay circuit 220 is an example of a succeeding delay circuit among a plurality of delay circuits in the delay circuitry 200B. In at least one embodiment, the delay circuitry 200B further comprises one or more delay circuits preceding the delay circuit 210 to generate the signal Ai input into the delay circuit 210, and/or one or more delay circuits succeeding the delay circuit 220 to receive and further delay the signal Ai+2 output from the delay circuit 220.

Figure 2C:
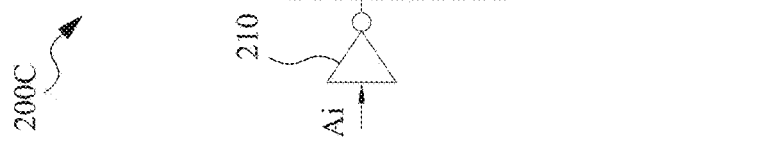
FIG. 2C is a schematic equivalent circuit diagram of a circuit region of an IC device, in accordance with some embodiments.

FIG. 2C is a schematic equivalent circuit diagram 200C of the delay circuitry 200B, in accordance with some embodiments.

In the equivalent circuit diagram 200C, each of the delay circuits 210, 220 is schematically represented by a corresponding inverter symbol, and each of the output connectors 216, 226 is represented by a resistor-capacitor (RC) circuit. In some embodiments, the output connector 216 comprises one or more conductive patterns in one or more metal layers, and one or more via structures electrically coupling the conductive patterns with each other and/or with the output of the corresponding delay circuit 210. The output connector 216 is represented in the equivalent circuit diagram 200C by a resistor Ri corresponding to the resistance of the one or more conductive patterns in the output connector 216 (the resistance of the one or more via structures in the output connector 216 is negligible in at least one embodiment). The output connector 216 is further represented in the equivalent circuit diagram 200C by a capacitor Ci corresponding to the parasitic capacitance formed by the one or more conductive patterns in the output connector 216 with other, adjacent conductive patterns in the IC device. As illustrated in FIG. 2C, the resistor Ri is electrically coupled between the output of the delay circuit 210 and the input of the delay circuit 220, and the capacitor Ci is electrically coupled between the input of the delay circuit 220 and the ground. Similarly, the output connector 226 is represented in the equivalent circuit diagram 200C by corresponding resister Ri+1 and capacitor Ci+1.

As can be seen in FIG. 2C, the output connector 216 represented by the corresponding RC circuit of the resistor Ri and capacitor Ci causes an additional time delay equal to Ri×Ci between the output of the delay circuit 210 and the input of the delay circuit 220, due to charging/discharging cycles in the RC circuit when the signal on the output connector 216 changes between a high level and a low level. In accordance with some embodiments, by configuring the output connector 216 to increase or decrease the corresponding resistance of resistor Ri and/or capacitance of capacitor Ci, it is possible to vary the additional time delay associated with the output connector 216, and to vary the time delay imparted by the delay circuit 210 and the output connector 216 to the signal to be input into the delay circuit 220. An additional time delay associated with the output connector 226 at the output of the delay circuit 220 is configurable in a similar manner, in one or more embodiments.

Figure 3A:
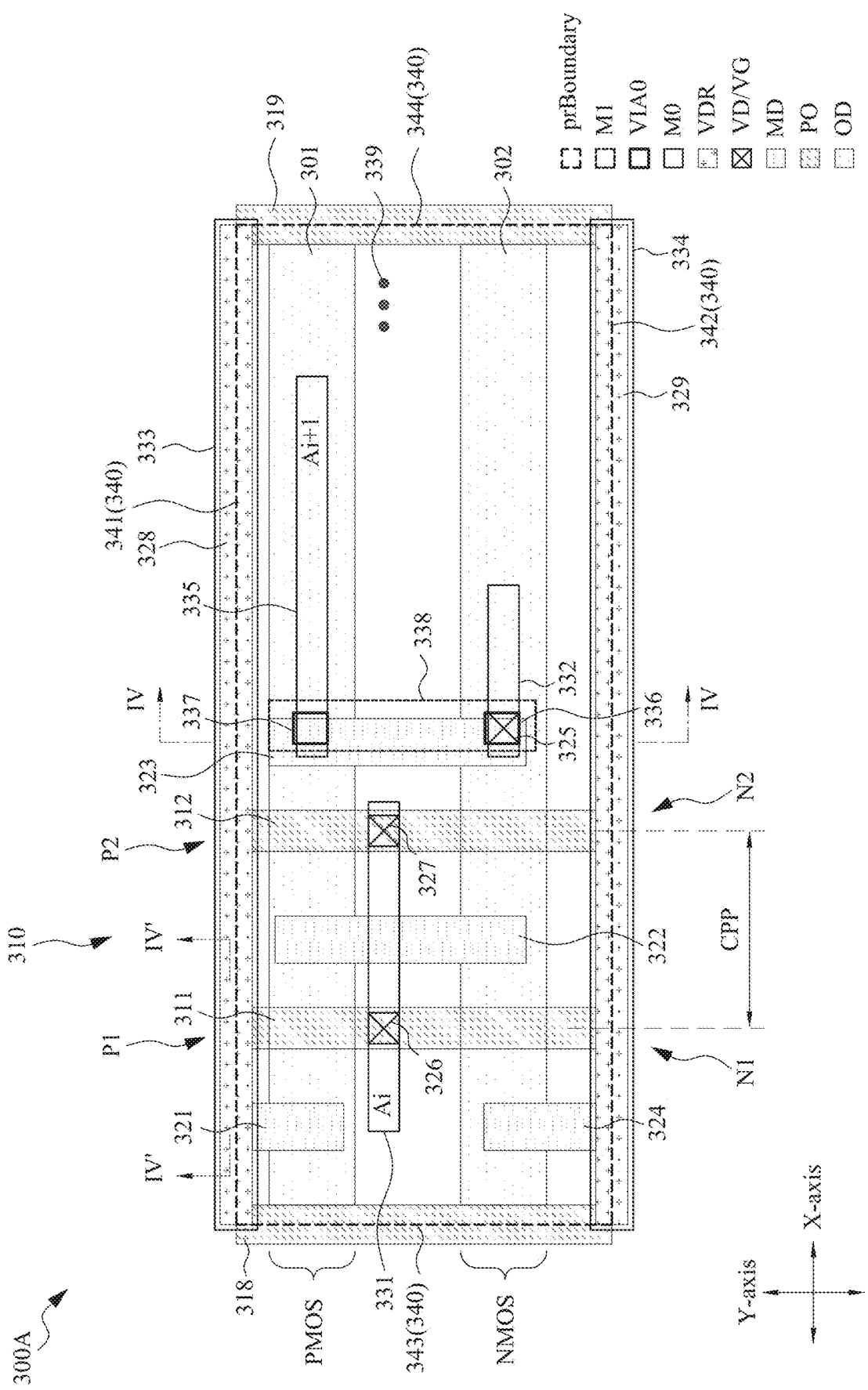
FIGS. 3A-3D are schematic views of layout diagrams of various delay cells in one or more IC devices, in accordance with some embodiments.

FIG. 3A is a schematic view of a layout diagram of a delay cell 300A in an IC device, in accordance with some embodiments. In at least one embodiment, the delay cell 300A corresponds to the delay circuitry 200B, or to a part of the delay circuitry 200B where the delay circuitry 200B comprises multiple delay cells. Corresponding elements in FIG. 2B and FIG. 3A are designated by the same reference numerals. In at least one embodiment, the layout diagram of the delay cell 300A is stored as a standard cell in a standard cell library on a non-transitory computer-readable medium.

As illustrated in FIG. 3A, the delay cell 300A comprises a plurality of active regions 301, 302. Active regions are sometimes referred to as oxide-definition (OD) regions or source/drain regions, and are schematically illustrated in the drawings with the label "OD." In at least one embodiment, the active regions 301, 302 are over a front side of a substrate as described herein. The active regions 301, 302 are elongated along a first axis, e.g., the X-axis. The active regions 301, 302 include P-type dopants and/or N-type dopants to form one or more circuit elements or devices. Examples of circuit elements include, but are not limited to, transistors and diodes. Examples of transistors include, but are not limited to, metal oxide semiconductor field effect transistors (MOSFET), complementary metal oxide semiconductors (CMOS) transistors, P-channel metal-oxide semiconductors (PMOS), N-channel metal-oxide semiconductors (NMOS), bipolar junction transistors (BJT), high voltage transistors, high frequency transistors, P-channel and/or N-channel field effect transistors (PFETs/NFETs), FinFETs, planar MOS transistors with raised source/drains, nanosheet FETs, nanowire FETs, or the like. An active region configured to form one or more PMOS devices is sometimes referred to as "PMOS active region," and an active region configured to form one or more NMOS devices is sometimes referred to as "NMOS active region." In the example configuration described with respect to FIG. 3A, the active region 301 comprises a PMOS active region, and the active region 302 comprise an NMOS active region. Other configurations are within the scopes of various embodiments. In some embodiments, a PMOS active region is referred to as an active region of a first or second semiconductor type, and an NMOS active region is referred to as an active region of the second or first semiconductor type.

The delay cell 300A further comprises a plurality of gate regions 311, 312, 318, 319 over the active regions 301, 302. The gate regions 311, 312, 318, 319 are elongated along a second axis, e.g., the Y-axis, which is transverse to the X-axis. The gate regions 311, 312, 318, 319 are arranged along the X axis at a regular pitch designated at CPP (contacted poly pitch) in FIG. 3A. CPP is a center-to-center distance along the X axis between two directly adjacent gate regions. Two gate regions are considered directly adjacent where there are no other gate regions therebetween. The gate regions 311, 312, 318, 319 comprise a conductive material, such as, polysilicon, which is sometimes referred to as "poly." The gate regions 311, 312, 318, 319 are schematically illustrated in the drawings with the label "PO." Other conductive materials for the gate regions, such as metals, are within the scope of various embodiments. In the example configuration in FIG. 3A, the gate regions 311, 312 are functional gate regions which, together with the active regions 301, 302, configure a plurality of transistors as described herein. In some embodiments, the gate regions 318, 319 are non-functional, or dummy, gate regions. Dummy gate regions are not configured to form transistors together with underlying active regions, and/or one or more transistors formed by dummy gate regions together with the underlying active regions are not electrically coupled to other circuitry in the delay cell 300A and/or the IC device including the delay cell 300A. In at least one embodiment, non-functional, or dummy, gate regions include dielectric material in a manufactured IC device.

The delay cell 300A further comprises a plurality of transistors configured by the gate regions 311, 312 and the active regions 301, 302. For example, the transistors P1, P2 are configured by the PMOS active region 301 together with the corresponding gate regions 311, 312. The transistors N1, N2 are configured by the NMOS active region 302 together with the corresponding gate regions 311, 312. The gate region 311 corresponds to the gates of the transistors P1, N1, and the gate region 312 corresponds to the gates of the transistors P2, N2. Source/drains of the transistors P1, P2 correspond to portions of the active region 301 on opposite sides of the corresponding gate regions 311, 312. Source/drains of the transistors N1, N2 correspond to portions of the active region 302 on opposite sides of the corresponding gate regions 311, 312. The transistors P1, P2, N1, N2 are electrically coupled into a delay circuit schematically indicated as 310 in FIG. 3A and corresponding to the delay circuit 210.

The delay cell 300A further comprises contact structures over and in electrical contact with the corresponding source/drains in the active regions 301, 302. Contact structures are sometimes referred to as metal-to-device structures, and are schematically illustrated in the drawings with the label "MD." An MD contact structure includes a conductive material formed over a corresponding source/drain in the corresponding active region to define an electrical connection from one or more devices formed in the active region to other internal circuitry of the IC or to outside circuitry. In the example configuration in FIG. 3A, contact structures 321, 322, 323 are over the active region 301, in electrical contact with the corresponding source/drains of the transistors P1, P2, and arranged alternatingly with the gate regions 318, 311, 312 along the X-axis. A pitch, i.e., a center-to-center distance along the X axis, between directly adjacent contact structures is the same as the pitch CPP between directly adjacent gate regions. Contact structures 324, 322, 323 are over the active region 302, in electrical contact with the corresponding source/drains of the transistors N1, N2, and arranged alternatingly with the gate regions 318, 311, 312 along the X-axis. The contact structures 321, 324 are aligned along the Y-axis and are each in electrical contact with a corresponding active region, i.e., either of the active regions 301, 302. The contact structures 322, 323 extend continuously along the Y-axis to be in electrical contact with multiple active regions, i.e., to be in electrical contact with both the active regions 301, 302. The contact structures 322, 323 that are in electrical contact with multiple active regions are referred to herein as extended contact structures. An example conductive material of the contact structures includes metal. Other configurations are within the scopes of various embodiments. In the example configuration in FIG. 3A, the contact structure 321 corresponds to the source/drain of the transistor P1 that is electrically coupled to VDD, the contact structure 324 corresponds to the source/drain of the transistor N1 that is electrically coupled to VSS, the contact structures 322 corresponds to the node 215, and the contact structure 323 corresponds to the source/drains of the transistors P2, N2 to be electrically coupled to an output of the delay circuit 310. The gates of the transistors P1, P2, N1, N2 are to be electrically coupled to an input of the delay circuit 310.

The delay cell 300A further comprises via structures over and in electrical contact with the corresponding gate regions or contact structures. A via structure over and in electrical contact with a contact structure is sometimes referred to as via-to-device (VD). A via structure over and in electrical contact with a gate region is sometimes referred to as via-to-gate (VG). VD and VG via structures are schematically illustrated in the drawings with the label "VD/VG." In the example configuration in FIG. 3A, a VD via structure 325 is over and in electrical contact with the contact structure 323. VG via structures 326, 327 are over and in electrical contact with the corresponding gate regions 311, 312. An example material of the VD and VG via structures includes metal. Other configurations are within the scopes of various embodiments.

The delay cell 300A further comprises VD rails 328, 329 which, similarly to VD via structures, are configured to be over and in electrical contact with an MD contact structure. The VD rail 328 is over and in electrical contact with the contact structure 321 to electrically couple the contact structure 321 to VDD as described herein. The VD rail 329 is over and in electrical contact with the contact structure 324 to electrically couple the contact structure 324 to VSS as described herein. In at least one embodiment, the VD rails 328, 329 fly over, but are not in electrical contact with, the gate regions 311, 312, e.g., as described with respect to FIG. 4B. The VD rails are schematically illustrated in the drawings with the label "VDR." A difference between VD rails and VD via structures resides in different shapes of VD rails and VD via structures in a X-Y plane. In some embodiments, a VD via structure has a shape of a square or close to a square, with a length to width ratio between 1:1 and 2:1, whereas a VD rail has an elongated shape with a length to width ratio greater than 2:1. In the example configuration in FIG. 3A, the VD rails 328, 329 extend along the X-axis over a whole length of the delay cell 300A. In at least one embodiment, one or more VD rails 328, 329 is/are omitted and/or replaced with VD via structures for electrically coupling the corresponding contact structures 321, 324 correspondingly to VDD, VSS.

In some embodiments, the delay cell 300A comprises one or more backside via structures (not shown) as alternatives to VD rails 328, 329, e.g., for electrically coupling the source/drains corresponding to the contact structures 321, 324 correspondingly to VDD, VSS. A backside via structure is a through via structure configured to extend through the substrate of an IC device comprising the delay cell 300A from a back side of the substrate. Such a backside via structure is configured to be in electrical contact with the back side of a corresponding source/drain in a corresponding active region. Backside via structures are configured to electrically couple the corresponding source/drains to corresponding conductive patterns in a backside-metal-zero (BM0) layer, as described herein. An example material of backside via structures includes metal. Other configurations are within the scopes of various embodiments.

The delay cell 300A further comprises a plurality of metal layers and via layers sequentially and alternatingly arranged over the VD, VG via structures and VD rails. The lowermost metal layer immediately over and in electrical contact with the VD, VG via structures and VD rails is an M0 (metal-zero) layer, a next metal layer immediately over the M0 layer is an M1 layer, a next metal layer immediately over the M1 layer is an M2 layer, or the like. A via layer VIAn is arranged between and electrically couple the Mn layer and the Mn+1 layer, where n is an integer from zero and up. For example, a via-zero (VIA0 or V0) layer is the lowermost via layer which is arranged between and electrically couple the M0 layer and the M1 layer. Other via layers are VIA1 (or V1), VIA2 (or V2), or the like.

The M0 layer is the lowermost metal layer over, or the closest metal layer to, the active regions 301, 302, on the front side of the substrate, as described herein. In the delay cell 300A, the M0 layer comprises M0 conductive patterns 331, 332, 333, 334, 335. The M0 conductive pattern 331 is over and in electrical contact with the VG via structures 326, 327. The M0 conductive pattern 331 is electrically coupled by the VG via structures 326, 327 to the gates of the transistors P1, P2, N1, N2, and configures the input of the delay circuit 310. The M0 conductive pattern 332 is over and in electrical contact with the VD via structure 325. The M0 conductive pattern 332 is electrically coupled by the VD via structure 325 and MD contact structure 323 to the corresponding source/drains of the transistors P2, N2, and configures the output of the delay circuit 310. The M0 conductive pattern 333 is over and in electrical contact with the VD rail 328. The M0 conductive pattern 333 is electrically coupled by the VD rail 328 to the corresponding source/drain of the transistor P1, and is configured as a VDD power rail. The M0 conductive pattern 334 is over and in electrical contact with the VD rail 329. The M0 conductive pattern 334 is electrically coupled by the VD rail 329 to the corresponding source/drain of the transistor N1, and is configured as a VSS power rail. The M0 conductive pattern 335 is part of an output connector associated with the delay circuit 310, as described herein. In at least one embodiment, the M0 conductive pattern 335 is the input of a succeeding delay circuit (e.g., a delay circuit corresponding to the delay circuit 220). For example, VG via structures similar to the VG via structures 326, 327 are under and in electrical contact with the M0 conductive pattern 335 to electrically couple the M0 conductive pattern 335 to gates of transistors in the succeeding delay circuit.

The delay cell 300A further comprises, in the VIA0 layer over the M0 layer, VIA0 via structures 336, 337 over and in electrical contact with the corresponding M0 conductive patterns 332, 335. In the example configuration in FIG. 3A, the VIA0 via structure 336 overlaps the VD via structure 325. Other configurations are within the scopes of various embodiments.

The delay cell 300A further comprises, in the M1 layer over the VIA0 layer, an M1 conductive pattern 338 over and in electrical contact with the VIA0 via structures 336, 337. In the example configuration in FIG. 3A, the M1 conductive pattern 338 overlaps the MD contact structure 323. Other configurations are within the scopes of various embodiments.

The delay cell 300A further comprises a boundary (or cell boundary) 340 which comprises edges 341, 342, 343, 344. The edges 341, 342 are elongated along the X axis, and the edges 343, 344 are elongated along the Y axis. The edges 341, 342, 343, 344 are connected together to form the closed boundary 340. In a place-and-route operation (also referred to as "automated placement and routing (APR)") described herein, cells are placed in an IC layout diagram in abutment with each other at their respective boundaries. The boundary 340 is sometimes referred to as "place-and-route boundary" and is schematically illustrated in the drawings with the label "prBoundary." The rectangular shape of the boundary 340 is an example. Other boundary shapes for various cells are within the scope of various embodiments. In some embodiments, the edges 341, 342 coincide with centerlines of the corresponding VD rails 328, 329, and/or centerlines of the corresponding M0 conductive patterns 333, 334. In some embodiments, the edges 343, 344 coincide with centerlines of dummy or non-functional gate regions 318, 319. Between the edges 341, 342 and along the Y axis, the delay cell 300A contains one PMOS active region, i.e., 301, and one NMOS active region, i.e., 302, and is considered to have a height corresponding to one cell height. As described with respect to FIGS. 5A-5F, another cell or circuit region containing along the Y axis two PMOS active regions and two NMOS active regions is considered to have a height corresponding to two cell heights, or double cell height.

In at least one embodiment, the delay cell 300A comprises more than one delay circuits. For example, one or more further delay circuits corresponding to the delay circuit 220 are electrically coupled in series to the output of the delay circuit 310 through the M0 conductive pattern 335. Such one or more further delay circuits are schematically illustrated in FIG. 3A by an ellipsis symbol 339. In at least one embodiment, the delay circuit 310 is the only delay circuit in the delay cell 300A, and the M0 conductive pattern 335 is configured to electrically couple the delay cell 300A with another circuitry or cell.

In the delay cell 300A, the M0 conductive pattern 332, which is the output of the delay circuit 310, is electrically coupled sequentially through the VIA0 via structure 336, the M1 conductive pattern 338, the VIA0 via structure 337 to the M0 conductive pattern 335. In some embodiments, other than the VD via structure 325 and the VIA0 via structure 336, the M0 conductive pattern 332 is not in direct electrical contact with another circuit element. The M0 conductive pattern 335, VIA0 via structures 336, 337 and the M1 conductive pattern 338 together configure an output connector corresponding to the output connector 216 and electrically coupled to the output (i.e., the M0 conductive pattern 332) of the delay circuit 310. An example configuration of an output connector in an IC device is described herein with respect to FIG. 4A.

In the delay cell 300A, the M0 layer is an example of a first metal layer having therein the output (i.e., the M0 conductive pattern 332) of the delay circuit 310 and a first conductive pattern (e.g., the M0 conductive pattern 335). The M1 layer is an example of a second metal layer different from the first metal layer, and having therein a second conductive pattern (e.g., the M1 conductive pattern 338) which electrically couples the output (e.g., 332) to the first conductive pattern (e.g., 335). Although in the example configuration in FIG. 3A, the first metal layer (e.g., M0 layer) is under the second metal layer (e.g., M1 layer), other configurations in which the first metal layer is over the second metal layer are within the scopes of various embodiments. In at least one embodiment, the first metal layer having the output of a delay circuit is any metal layer in an IC device, and the second metal layer is any other metal layer in the IC device.

In some embodiments, because a further conductive pattern (e.g., M1 conductive pattern 338) in a metal layer different from the metal layer including an output (e.g., M0 conductive pattern 332) of a delay circuit (e.g., delay circuit 310) is included as part of an output connector electrically coupled to the output of the delay circuit, it is possible to increase the resistance and/or capacitance of the output connector due to the further conductive pattern. As a result, an additional further time delay is obtainable by the output connector, as described with respect to FIG. 2C. Such an additional time delay is added to the time delay provided by the delay circuit 310, and makes it possible, in at least one embodiment, to reduce the number of delay circuits in a delay cell or the number of delay cells in delay circuitry (e.g., delay circuitry 203) needed to provide a required time delay to satisfy a timing requirement. Consequently, in at least one embodiment, a chip (or wafer) area needed for the delay circuitry is reduced which, in turn, increases delay cell efficiency (e.g., a ratio of time delay to delay cell area).

Further, in some embodiments, because the M1 conductive pattern 338 overlaps the MD contact structure 323 as described herein, the addition of the M1 conductive pattern 338 does not increase a dimension of the delay cell 300A, especially along the X-axis. As a result, a greater time delay is obtainable without increasing the delay cell area, in at least one embodiment. One or more of the described advantages in accordance with some embodiments are improvements over other approaches which do not include a further conductive pattern like the M1 conductive pattern 338 and which directly use the output or M0 conductive pattern 332 for electrical connection to the succeeding delay circuit.

Figure 3B:
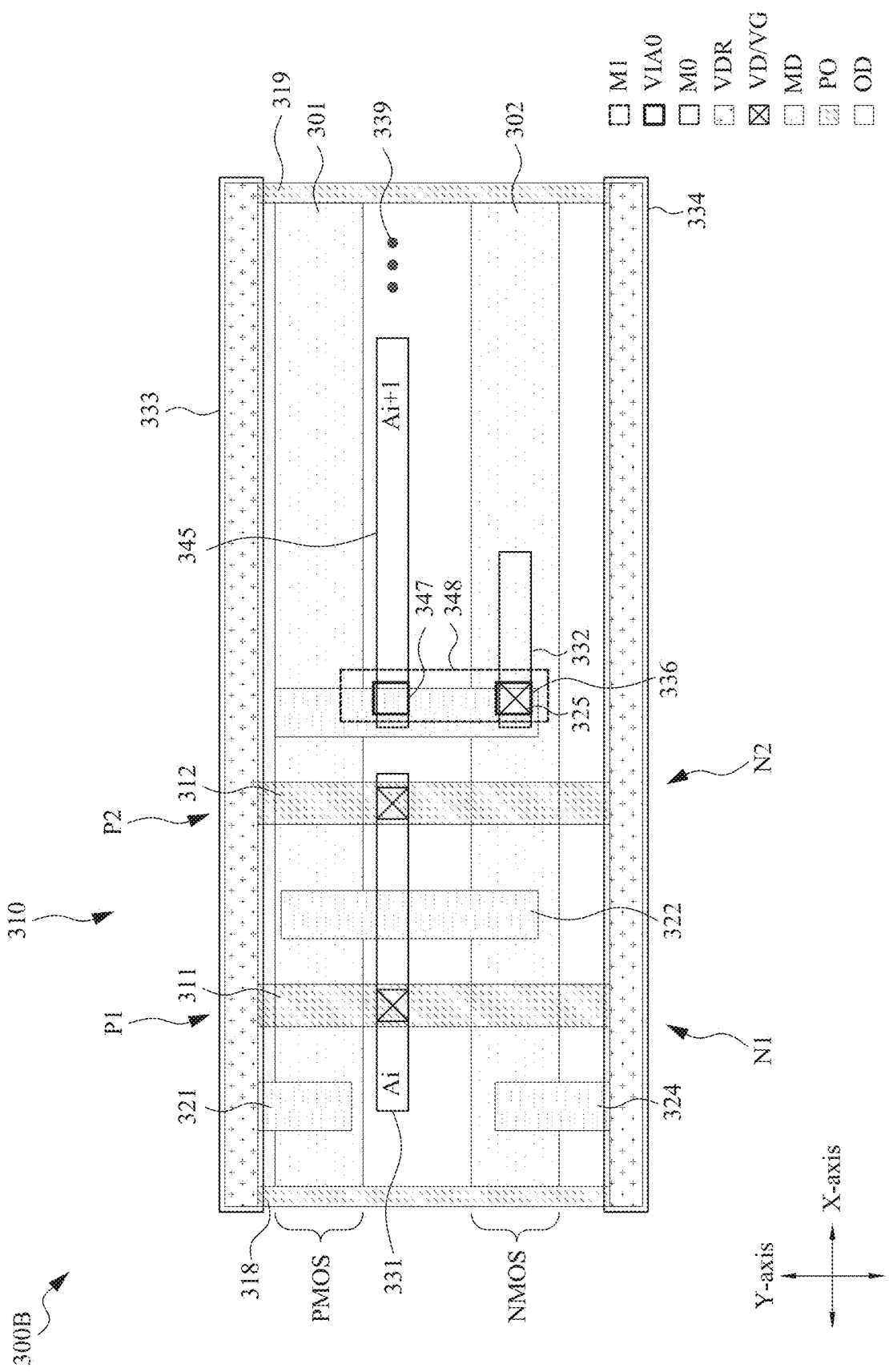

FIG. 3B is a schematic view of a layout diagram of a delay cell 300B in an IC device, in accordance with some embodiments. In at least one embodiment, the delay cell 300B corresponds to the delay circuitry 200B, or to a part of the delay circuitry 200B where the delay circuitry 200B comprises multiple delay cells. Corresponding elements in FIG. 3A and FIG. 3B are designated by the same reference numerals. For simplicity, the cell boundary of the delay cell 300B, which is similar to the boundary 340 of the delay cell 300A is omitted in FIG. 3B. In at least one embodiment, the layout diagram of the delay cell 300B is stored as a standard cell in a standard cell library on a non-transitory computer-readable medium.

The delay cell 300B differs from the delay cell 300A in the configuration of the output connector electrically coupled to the output of the delay circuit 310. Specifically, the output connector in the delay cell 300B comprises a shorter M1 conductive pattern 348 than the corresponding M1 conductive pattern 338 in the delay cell 300A. The output connector in the delay cell 300B further comprises a VIA0 via structure 347 and an M0 conductive pattern 345 corresponding to the VIA0 via structure 337 and M0 conductive pattern 335 in the delay cell 300A. While the VIA0 via structure 337 and M0 conductive pattern 335 in the delay cell 300A are arranged over the active region 301, the corresponding VIA0 via structure 347 and M0 conductive pattern 345 in the delay cell 300B are arranged over a spacing or intermediate region between the active regions 301, 302, due to the shorter M1 conductive pattern 348. In the example configuration in FIG. 3B, the M0 conductive pattern 331 which is the input of the delay circuit 310 is aligned along the X-axis with the M0 conductive pattern 345 which is to be electrically coupled to an input of a succeeding delay circuit. Other configurations are within the scopes of various embodiments.

In some embodiments, the shorter M1 conductive pattern 348 provides smaller resistance and/or capacitance to the output connector in the delay cell 300B than in the delay cell 300A. As a result, the output connector in the delay cell 300B provides a smaller additional time delay than the output connector in the delay cell 300A. Nevertheless, in at least one embodiment, one or more advantages described herein with respect to the delay cell 300A are achievable in the delay cell 300B.

In at least one embodiment, it is possible to adjust the additional time delay associated with an output connector by switching from one output connector configuration (e.g., in the delay cell 300A or 300B) to another output connector configuration (e.g., in the delay cell 300B or 300A). This time delay adjustability or customizability is a further advantage, in one or more embodiments.

Figure 3C:
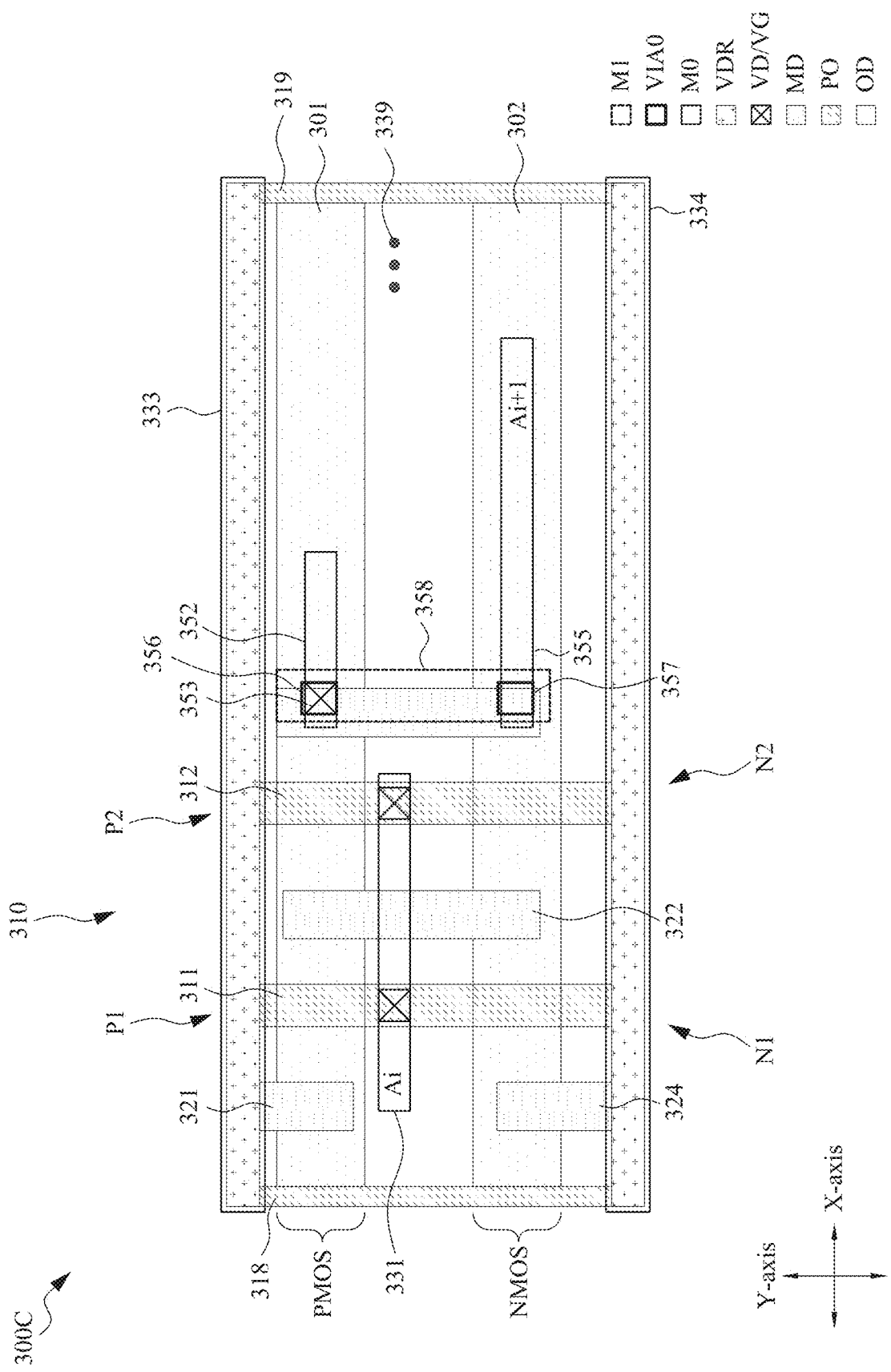

FIG. 3C is a schematic view of a layout diagram of a delay cell 300C in an IC device, in accordance with some embodiments. In at least one embodiment, the delay cell 300C corresponds to the delay circuitry 200B, or to a part of the delay circuitry 200B where the delay circuitry 200B comprises multiple delay cells. Corresponding elements in FIG. 3A and FIG. 3C are designated by the same reference numerals. For simplicity, the cell boundary of the delay cell 300C, which is similar to the boundary 340 of the delay cell 300A is omitted in FIG. 3C. In at least one embodiment, the layout diagram of the delay cell 300C is stored as a standard cell in a standard cell library on a non-transitory computer-readable medium.

The delay cell 300C comprises a VD via structure 353, an M0 conductive pattern 352, a VIA0 via structure 356, an M1 conductive pattern 358, a VIA0 via structure 357, and an M0 conductive pattern 355 corresponding to the VD via structure 325, M0 conductive pattern 332, VIA0 via structure 336, M1 conductive pattern 338, VIA0 via structure 337, and M0 conductive pattern 335 in the delay cell 300A. In the delay cell 300C, the M0 conductive pattern 352 is the output of the delay circuit 310 and is over the active region 301. This is different from the delay cell 300A in which the output of the delay circuit 310 is the M0 conductive pattern 332 which is over the active region 302. Further, in the delay cell 300C, the M0 conductive pattern 355 which is to be electrically coupled to the input of a succeeding delay circuit is over the active region 302. This is different from the delay cell 300A in which the corresponding M0 conductive pattern 335 is over the active region 301. In at least one embodiment, one or more advantages described herein with respect to the delay cell 300A and/or delay cell 300B are achievable in the delay cell 300C.

Figure 3D:
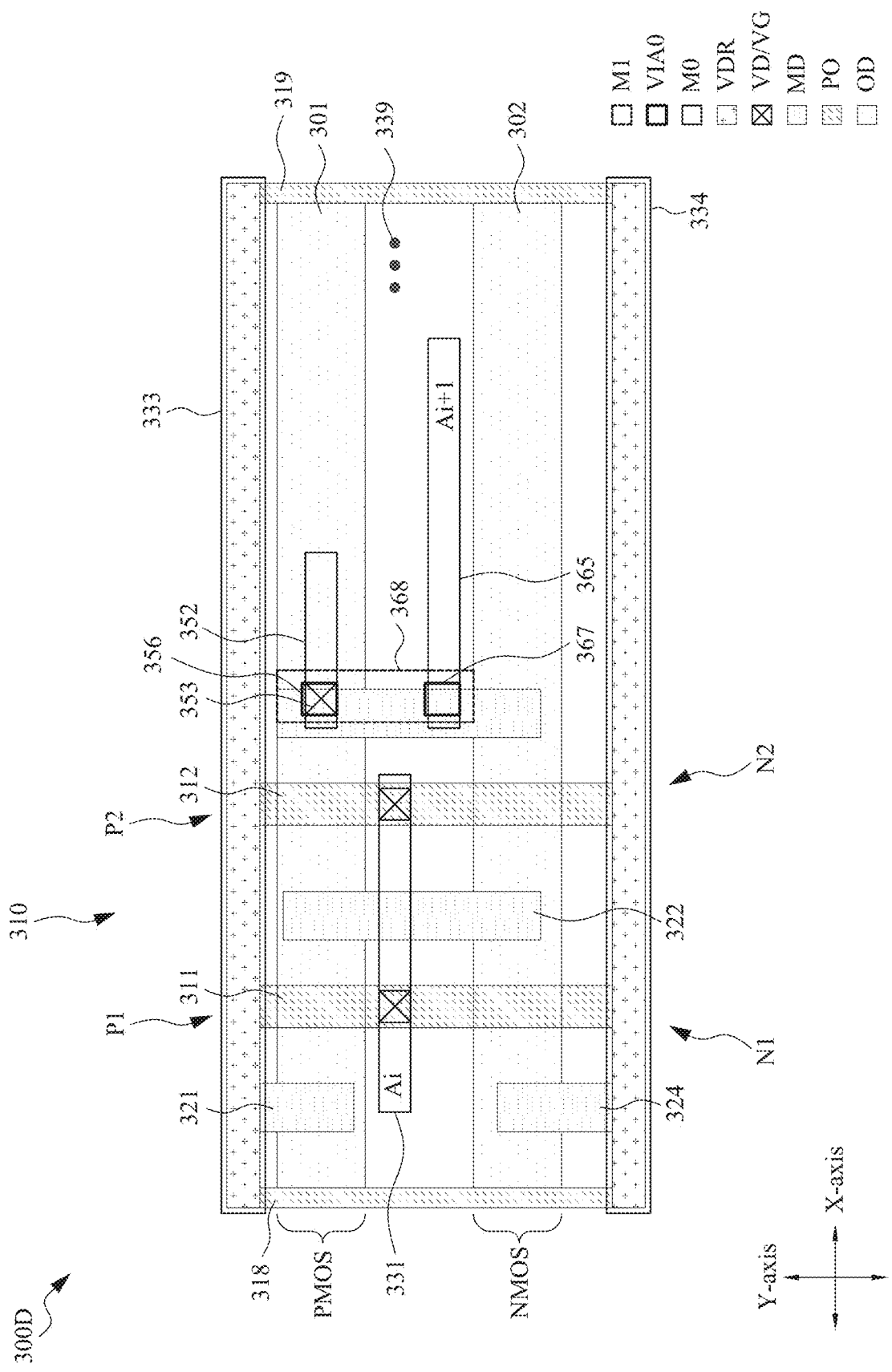

FIG. 3D is a schematic view of a layout diagram of a delay cell 300D in an IC device, in accordance with some embodiments. In at least one embodiment, the delay cell 300D corresponds to the delay circuitry 200B, or to a part of the delay circuitry 200B where the delay circuitry 200B comprises multiple delay cells. Corresponding elements in FIG. 3C and FIG. 3D are designated by the same reference numerals. For simplicity, the cell boundary of the delay cell 300D, which is similar to the boundary 340 of the delay cell 300A is omitted in FIG. 3D. In at least one embodiment, the layout diagram of the delay cell 300D is stored as a standard cell in a standard cell library on a non-transitory computer-readable medium.

The delay cell 300D differs from the delay cell 300C in the configuration of the output connector electrically coupled to the output of the delay circuit 310. Specifically, the output connector in the delay cell 300D comprises a shorter M1 conductive pattern 368 than the corresponding M1 conductive pattern 358 in the delay cell 300C. The output connector in the delay cell 300D further comprises a VIA0 via structure 367 and an M0 conductive pattern 365 corresponding to the VIA0 via structure 357 and M0 conductive pattern 355 in the delay cell 300C. While the VIA0 via structure 357 and M0 conductive pattern 355 in the delay cell 300C are arranged over the active region 302, the corresponding VIA0 via structure 367 and M0 conductive pattern 365 in the delay cell 300D are arranged over a spacing or intermediate region between the active regions 301, 302, due to the shorter M1 conductive pattern 368. In at least one embodiment, one or more advantages described herein with respect to the delay cell 300A and/or delay cell 300B and/or delay cell 300C are achievable in the delay cell 300D.

FIG. 4A is a schematic cross-sectional view, taken along line IV-IV in FIG. 3A, of an IC device 400, in accordance with some embodiments.

The IC device 400 comprises a circuit region corresponding to the delay cell 300A described with respect to FIG. 3A. Components in FIG. 4A having corresponding components in FIG. 3A are designated by the reference numerals of FIG. 3A increased by 100. For example, the IC device 400 comprises MD contact structure 423, VD via structure 425, VD rails 428, 429, M0 conductive patterns 432, 433, 434, 435, VIA0 via structures 436, 437, and M1 conductive pattern 438 corresponding to the MD contact structure 323, VD via structure 325, VD rails 328, 329, M0 conductive patterns 332, 333, 334, 335, VIA0 via structures 336, 338, and M1 conductive pattern 338 in the delay cell 300A.

As illustrated in FIG. 4A, the IC device 400 comprises a substrate 450 over which the circuit region corresponding to the delay cell 300A is formed. The substrate 450 has a thickness direction along a Z-axis. P-type and N-type dopants are added to the substrate 450 to correspondingly form a P-doped region 451 and an N-doped region 452 corresponding to the active regions 301, 302, and to also form an N well 453 in which the P-doped region 451 is formed. In some embodiments, isolation structures are formed between adjacent P well/P-doped regions and N well/N-doped regions. For simplicity, isolation structures are omitted from FIG. 4A. The P-doped region 451 defines a source/drain of a transistor corresponding to the transistor P2. The N-doped region 452 defines a source/drain of a transistor corresponding to the transistor N2.

The IC device 400 further comprises contact structures for electrically coupling the source/drains of the transistors together and/or to other circuit elements in the circuitry of the IC device 400. For example, the MD contact structure 423 is over and in electrical contact with the P-doped region 451 and N-doped region 452.

The IC device 400 further comprises VD, VG via structures and VD rails over and in electrical contact with corresponding MD contact structures and/or gate regions. For example, the VD via structure 425 is over and in electrical contact with the MD contact structure 423.

The IC device 400 further comprises an interconnect structure 460 which is over the VD, VG via structures and VD rails. The interconnect structure 460 comprises a plurality of metal layers M0, M1, . . . and a plurality of via layers V0, V1, . . . arranged alternatingly in the thickness direction of the substrate 450, i.e., along the Z axis. The interconnect structure 460 further comprises various interlayer dielectric (ILD) layers (not shown) in which the metal layers and via layers are embedded. The metal layers and via layers of the interconnect structure 460 are configured to electrically couple various elements or circuits of the IC device 400 with each other, and with external circuitry. For simplicity, metal layers and via layers above the M1 layer are omitted in FIG. 4A. The M0 layer comprises M0 conductive patterns 432, 444, 434 correspondingly over and in electrical contact with the VD via structure 425, and the VD rails 428, 429. The M0 layer further comprises the M0 conductive patterns 435. The VIA0 layer comprises VIA0 via structures 436, 437 correspondingly over and in electrical contact with the M0 conductive patterns 432, 435 in the M0 layer. The M1 layer comprises an M1 conductive pattern 438 correspondingly over and in electrical contact with the VIA0 via structures 436, 437. In at least one embodiment, the IC device 400 further comprises one or more backside via structures (not shown) as described herein, a BM0 layer (not shown) in electrical contact with the backside via structures, and/or one or more further via layers, dielectric layers and metal layers (not shown) under the BM0 layer to form interconnections among circuit elements of the IC device 400 and/or to form electrical connections to external circuitry. Via layers and metal layers from the BM0 layer and below are sometimes referred to as backside via layers and backside metal layers.

In the IC device 400, the M0 conductive pattern 432 is the output of a delay circuit corresponding to the delay circuit 310 in the IC device 400. The M0 conductive pattern 435 is configured to be electrically coupled to the input of a succeeding delay circuit. The VIA0 via structures 436, 437, the M1 conductive pattern 438 and the M0 conductive pattern 435 together configure an output connector 416 corresponding to the output connector 216 in FIGS. 2B-2C, and/or the output connector described with respect to FIG. 3A.

FIG. 4B is a schematic cross-sectional view, taken along line IV'-IV' in FIG. 3A, of the IC device 400, in accordance with some embodiments. Components in FIG. 4B having corresponding components in FIG. 3A are designated by the reference numerals of FIG. 3A increased by 100. For example, the IC device 400, in FIG. 4B, further comprises a gate electrode 411, an MD contact structure 421 corresponding to the gate region 311 and the MD contact structure 321 in the delay cell 300A.

As illustrated in FIG. 4B, the IC device 400 further comprises a gate stack including gate dielectric layers 454, 455, and the gate electrode 411. In at least one embodiment, a gate dielectric layer replaces multiple gate dielectric layers 454, 455. Example materials of the gate dielectric layer or layers include $HfO_2$, $ZrO_2$, or the like. Example materials of the gate electrode 411 include polysilicon, metal, or the like. As illustrated in FIG. 4B, the VD rail 428 flies over, but is not in electrical contact with, the gate electrode 411. In at least one embodiment, one or more advantages described herein with respect to FIG. 3A are achievable in the IC device 400.

Figure 5A:
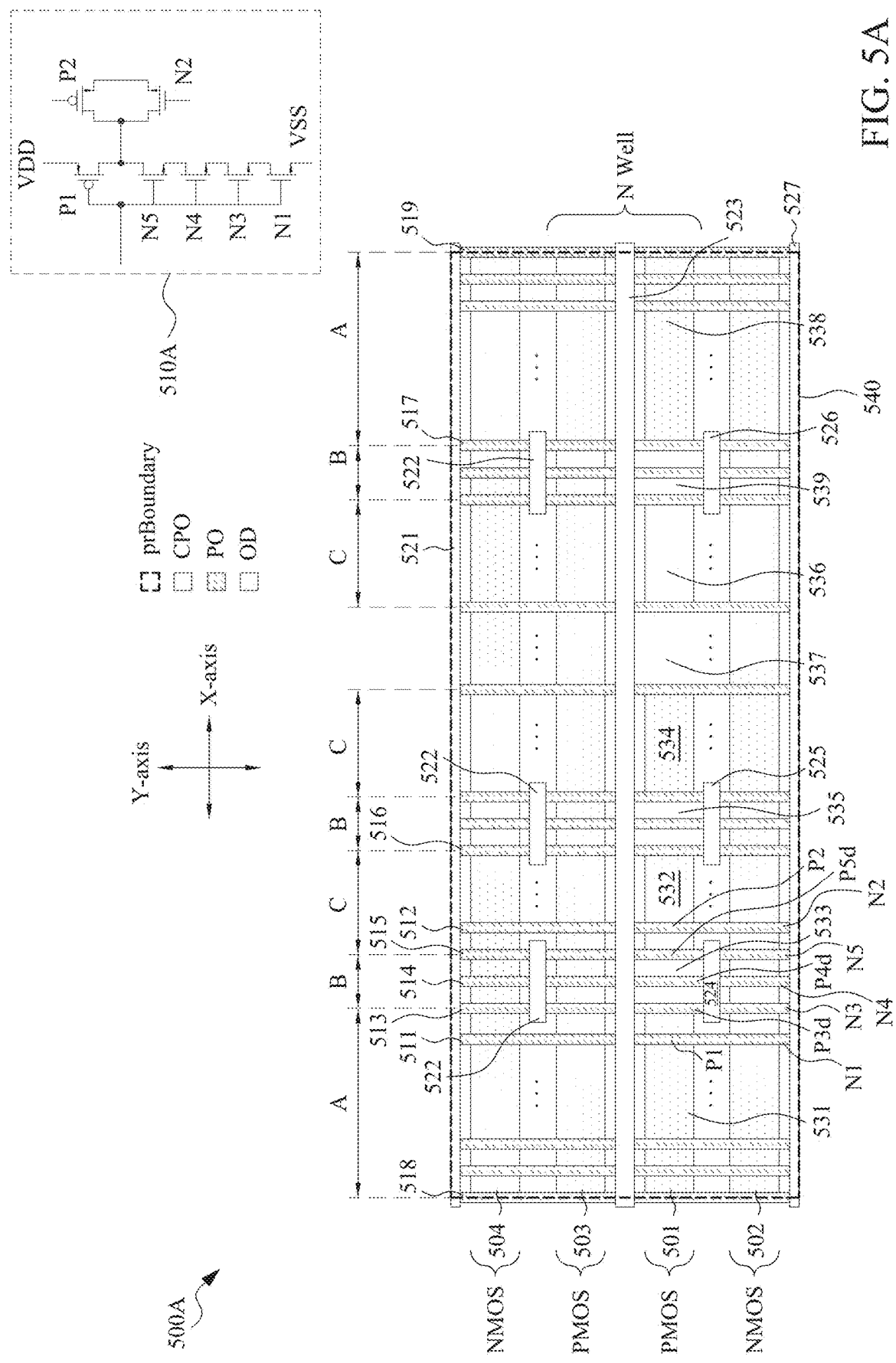
FIGS. 5A-5F are simplified schematic views of layout diagrams of various delay cells in one or more IC devices, in accordance with some embodiments.

FIG. 5A is a simplified schematic view of a layout diagram of a delay cell 500A in an IC device, in accordance with some embodiments. In at least one embodiment, the delay cell 500A corresponds to the delay circuitry 200B, or to a part of the delay circuitry 200B where the delay circuitry 200B comprises multiple delay cells. Corresponding elements in FIG. 2B and FIG. 5A are designated by the same reference numerals. In at least one embodiment, the layout diagram of the delay cell 500A is stored as a standard cell in a standard cell library on a non-transitory computer-readable medium.

As illustrated in FIG. 5A, the delay cell 500A comprises a plurality of active regions 501, 502, 503, 504 extending along the X-axis. In the example configuration in FIG. 5A, the active regions 501, 503 are PMOS active regions, and the active regions 502, 504 are NMOS active regions. Other configurations are within the scopes of various embodiments. The PMOS active regions 501, 503 are adjacent each other along the Y-axis, and are formed in a common N well. In at least one embodiment, the active regions 501, 502 correspond to the active regions 301, 302 described with respect to FIG. 3A.

The delay cell 500A further comprises a plurality of gate regions extending along the Y-axis over the active regions 501-504. For simplicity, not all gate regions in the delay cell 500A are shown or given a reference numeral in FIG. 5A. Some of the gate regions of the delay cell 500A are indicated as gate regions 511-519. The gate regions of the delay cell 500A are arranged along the X axis at a regular pitch CPP as described herein. In the example configuration in FIG. 5A, the gate regions 511, 512 are functional gate regions, the gate regions 518, 519 are dummy gate regions, and the gate regions 513, 514, 515, 516, 517 are configured as functional or dummy gate regions, as described herein.

The delay cell 500A further comprises a plurality of cut-poly regions 521-527 of a cut-poly mask which extend along the X axis and indicate areas where the gate regions are disconnected. The cut-poly regions 521-527 are schematically illustrated in the drawings with the label "CPO." For example, the cut-poly region 523 extends across all gate regions, and indicates that each of the gate regions is separated by the cut-poly region 523 into an upper part over the active regions 503, 504 and a lower part over the active regions 501, 502. The cut-poly region 524 extends across the lower parts of the gate regions 513-515, and indicates that the lower part of each of the gate regions 513-515 is further separated into two disconnected gates. For example, the lower part of the gate region 513 is separated into gates P3d, N3, the lower part of the gate region 514 is separated into gates P4d, N4, and the lower part of the gate region 515 is separated into gates P5d, N5. The cut-poly regions 521, 527 extend along edges of a boundary 540 described herein.

In some embodiments, the layout of the delay cell 500A has an upper part over the active regions 503, 504 with a configuration similar to a configuration of a lower part over the active regions 501, 502. In at least one embodiment, the delay cell 500A is symmetrical across a longitudinal center line of the cut-poly region 523

The delay cell 500A further comprises a boundary (or cell boundary) 540 similar to the boundary 340 described with respect to FIG. 3A. The boundary 540 comprises a pair of edges (not numbered for simplicity) elongated along the X axis, and overlapping the cut-poly regions 521, 527. The boundary 540 comprises a further pair of edges (not numbered for simplicity) elongated along the Y axis, and overlapping the dummy gate regions 518, 519. In at least one embodiment, the edges elongated along the Y axis coincide correspondingly with center lines of the dummy gate regions 518, 519. The rectangular shape of the boundary 540 is an example. Other boundary shapes for various cells are within the scope of various embodiments. Between the edges elongated along the X axis, the delay cell 500A contains two PMOS active regions, i.e., 501, 503, and two NMOS active regions, i.e., 502, 504, and is considered to have a double cell height.

The delay cell 500A further comprises various MD contact structures, VD/VG via structures, VD rails, M0 conductive patterns, VIA0 via structures, M1 conductive patterns, further via and metal layers similar to corresponding features described with respect to FIGS. 3A-3D. For simplicity, MD contact structures and various features above the MD contact structures and gate regions are omitted from FIG. 5A.

A difference between the delay cell 500A and the delay cell 300A is that, while the delay cell 300A comprises active regions 301, 302 which are both continuous along the X-axis, the delay cell 500A comprises one or more active regions which are discontinuous along the X-axis. For example, the active region 501 extends discontinuously along the X-axis, and comprises at least a first portion 531 and a second portion 532 spaced from each other along the X-axis by a spacing or intermediate region 533. Doped regions and/or doped wells of the active region 501 are not formed in the intermediate region 533. In other words, the intermediate region 533 is not configured to form, together with a gate region extending thereover, a transistor. In the example configuration in FIG. 5A, the active region 501 comprises disconnected portions 531, 532, 534, 536, 538 arranged along the X-axis alternatingly with intermediate regions 533, 535, 537, 539. The number of intermediate regions in FIG. 5A is an example, and any natural number of intermediate regions in a delay cell is within the scopes of one or more embodiments. For example, in at least one embodiment, the delay cell 500A has a single intermediate region 533 in the active region 501 over the whole length of the delay cell 500A along the X-axis.

In the example configuration in FIG. 5A, the portion 531 is an end portion of the active region 501 at one end of the delay cell 500A along the X-axis, extends between center lines of the gate regions 518, 511, and has a dimension A. The portion 538 is another end portion of the active region 501 at the other end of the delay cell 500A along the X-axis, extends between center lines of the gate regions 517, 519, and has a dimension A. Each of the portions 532, 534, 536 of the active region 501 between the end portions 531, 538 is referred to as a middle portion, extends between center lines of corresponding gate regions, and has a dimension C. For example, the middle portion 532 extends between center lines of the gate regions 512, 516. Each of the intermediate regions 533, 535, 537, 539 extends between center lines of corresponding gate regions, and has a dimension B. For example, the intermediate region 533 extends between center lines of the gate regions 513, 515.

In the example configuration in FIG. 5A, the end portions 531, 538 have the same dimension A, the intermediate regions 533, 535, 537, 539 have the same dimension B, and the middle portions 532, 534, 536 have the same dimension C, where A>C>B. In an example, A≥9 CPP, B≥2 CPP and C≤9 CPP. A reason for the end portions 531, 538 to have a greater dimension than the middle portions 532, 534, 536 is that, in some embodiments, the end portions 531, 538 are configured to match with other cells when the delay cell 500A is placed in abutment with the other cells. However, other configurations are within the scopes of various embodiments. For example, in some embodiments, the end portions 531, 538 have different dimensions, and/or one or more of the intermediate regions 533, 535, 537, 539 have a dimension different from the other intermediate regions, and/or one or more of the middle portions 532, 534, 536 have a dimension different from the other middle portions 532, 534, 536. In one or more embodiments, the described relationship A>C>B is not necessarily observed. In at least one embodiment, A≥1 CPP, B≥1 CPP and C≥1 CPP. In one or more embodiments, the active region 503 is a discontinuous active region similar to the active region 501.

The active region 502 is a continuous active region that extends continuously along the X-axis. Along the Y-axis, the active region 502 overlaps the disconnected portions 531, 532, 534, 536, 538 of the active region 501, as well as the intermediate regions 533, 535, 537, 539 therebetween. In one or more embodiments, the active region 504 is a continuous active region similar to the active region 502.

The delay cell 500A further comprises a plurality of transistors configured by the described gate regions and active regions. Further, the plurality of transistors are electrically coupled into one or more delay circuits. For example, the lower part of the gate region 511 over the active regions 501, 502 configures gates P1, N1 for corresponding transistors P1, N1. For simplicity, a gate and a corresponding transistor are referred to by the same reference numeral. The lower part of the gate region 512 over the active regions 501, 502 configures gates P2, N2 for corresponding transistors P2, N2. In some embodiments, the transistors P1, P2, N1, N2 in the delay cell 500A correspond to the transistors P1, P2, N1, N2 described with respect to FIGS. 2B and 3A-3D. The gates N3, N4, N5 over the active region 502 configure corresponding transistors N3, N4, N5 which are NMOS transistors. The gates P3d, P4d, P5d are over the intermediate region 533 which is not configured to form a transistor. As a result, no transistors are formed by gates P3d, P4d, P5d over the intermediate region 533. The gates P3d, P4d, P5d are sometimes referred to as dummy gates.

The transistors P1-P2 and N1-N5 are electrically coupled into a delay circuit by various MD contact structures, VD/VG via structures, VD rails, M0 conductive patterns, VIA0 via structures, and/or M1 conductive pattern, which are similar to those described with respect to one or more of FIGS. 3A-3D, but are not shown in FIG. 5A for simplicity. In the example configuration in FIG. 5A, the transistors P1-P2 and N1-N5 are electrically coupled into a delay circuit 510A which is similar to the delay circuit 210 with the addition of transistors N3-N5 electrically coupled in series with the transistor N1. In some embodiments, the delay cell 500A comprises an output connector as described with respect to one or more of FIGS. 3A-3D, and electrically coupled to the output of the delay circuit 510A. In one or more embodiments, such an output connector is omitted, e.g., the output of the delay circuit 510A and an input of a succeeding delay circuit are configured by the same conductive pattern in a metal layer.

In one or more embodiments, the delay cell 500A further comprises one or more delay circuits preceding to and/or one or more delay circuits succeeding the delay circuit 510A. For example, one or more gate regions over the portion 531 of the active region 501 and a corresponding portion of the active region 502 configure further transistors which are electrically coupled into one or more delay circuits preceding to the delay circuit 510A. For another example, one or more gate regions over at least one of the portions 532, 534, 536, 538 of the active region 501 and a corresponding portion of the active region 502 configure further transistors which are electrically coupled into one or more delay circuits succeeding the delay circuit 510A. The delay circuits formed over the active regions 501, 502 in the delay cell 500A are electrically coupled in series to add up the time delays of the delay circuits to obtain a required time delay for satisfying a timing requirement. In at least one embodiment, one or more delay circuits are configured over the active regions 503, 504 and/or electrically coupled in a manner similar to that described for the active regions 501, 502.

As described herein, the delay circuit 510A is formed over a discontinuous active region 501. In some situations, depending on one or more factors such as a dopant type (N-type or P-type) and/or technology for active region formation, a long continuous active region may experience high stress which potentially affects performance of the IC device. By configuring the active region 501 as a discontinuous active region, the stress on the active region 501 is reduced. A discontinuous active region also has a lower leakage current up to about 20% (e.g., the leakage current is reduced from 100% to about 80%). With the reduction of stress and/or leakage current in the active region 501, a threshold voltage of transistors in the active region 501 is increased. As a result, in at least one embodiment, the time delay provided by the delay circuit 510A becomes larger and/or the delay cell efficiency is increased.

Further, because the transistors N3-N5 are additionally electrically coupled in series with the transistor N1 in the delay cell 500A, the time delay provided by the delay circuit 510A in one or more embodiments becomes larger and/or the delay cell efficiency is increased, compared to when the transistors N3-N5 are not included in the delay circuit. One or more of the described advantages in accordance with some embodiments are improvements over other approaches which do not include a discontinuous active region and/or additional transistors in the delay circuit. In some embodiments, when one or more output connectors described with respect to FIGS. 3A-3D are included in the delay cell 500A, one or more further advantages described with respect to FIGS. 3A-3D are additionally achievable in the delay cell 500A.

Figure 5B:
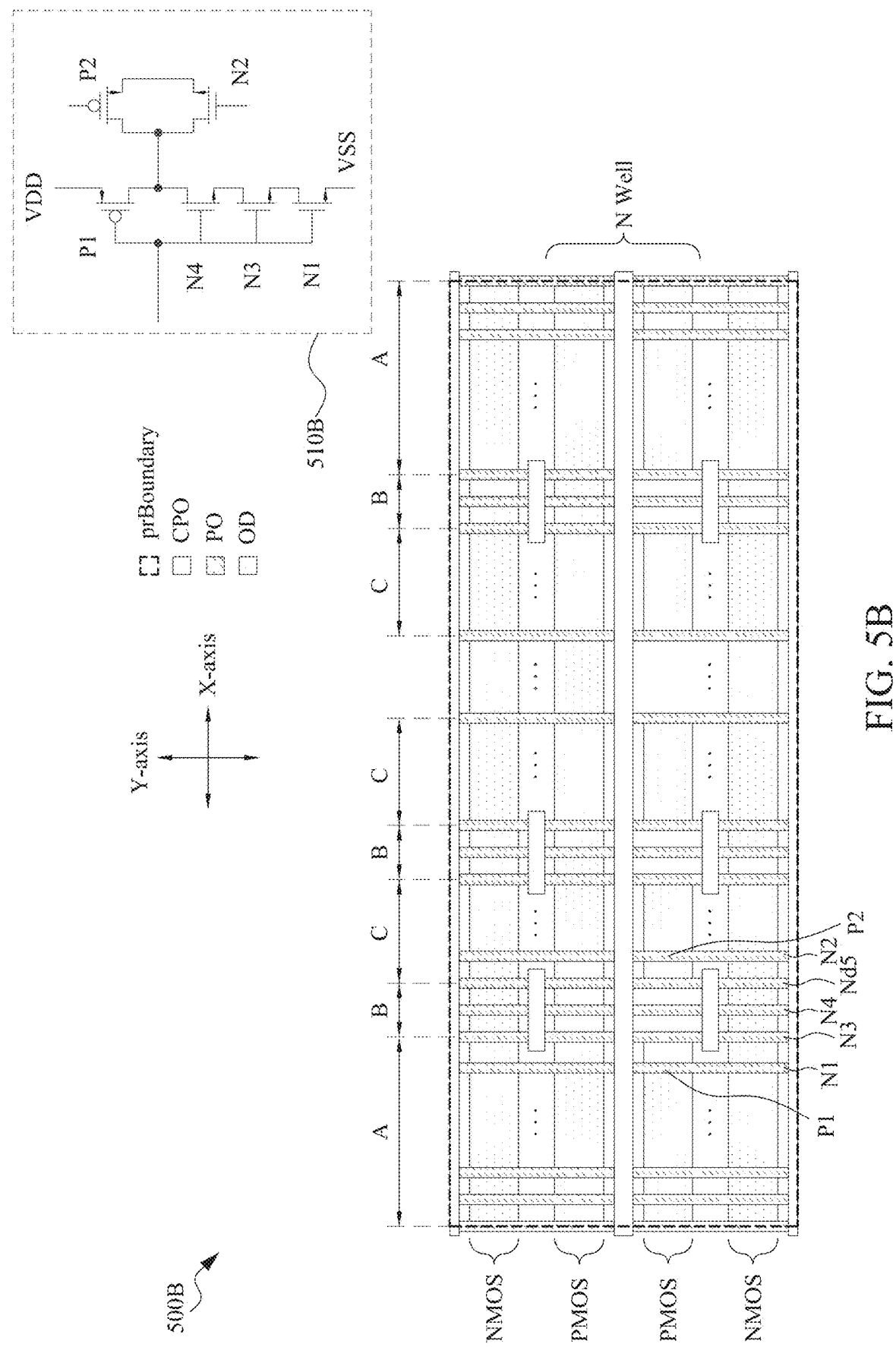

FIG. 5B is a schematic view of a layout diagram of a delay cell 500B in an IC device, in accordance with some embodiments. In at least one embodiment, the delay cell 500B corresponds to the delay circuitry 200B, or to a part of the delay circuitry 200B where the delay circuitry 200B comprises multiple delay cells. Corresponding elements in FIG. 5A and FIG. 5B are designated by the same reference numerals. In at least one embodiment, the layout diagram of the delay cell 500B is stored as a standard cell in a standard cell library on a non-transitory computer-readable medium.

The delay cell 500B is similar to the delay cell 500A, except that one of the gates N3-N5 is configured as a dummy gate. For example, the gate N5 in the delay cell 500A is configured as a dummy gate Nd5 in the delay cell 500B. As a result, a delay circuit 510B corresponding to the delay circuit 510A no longer includes the transistor N5, and there are two additional transistors N3, N4 electrically coupled in series to the transistor N1 in the delay circuit 510B. Compared to the delay circuit 510A, the delay circuit 510B has a smaller time delay. Nevertheless, in at least one embodiment, one or more advantages described herein with respect to the delay cell 500A are achievable in the delay cell 500B, compared to other approaches. In one or more embodiments, instead of the gate N5, either gate N3 or N4 in the delay cell 500A is configured as a dummy gate to obtain the delay cell 500B, with one or more similar advantages being achievable.

Figure 5C:
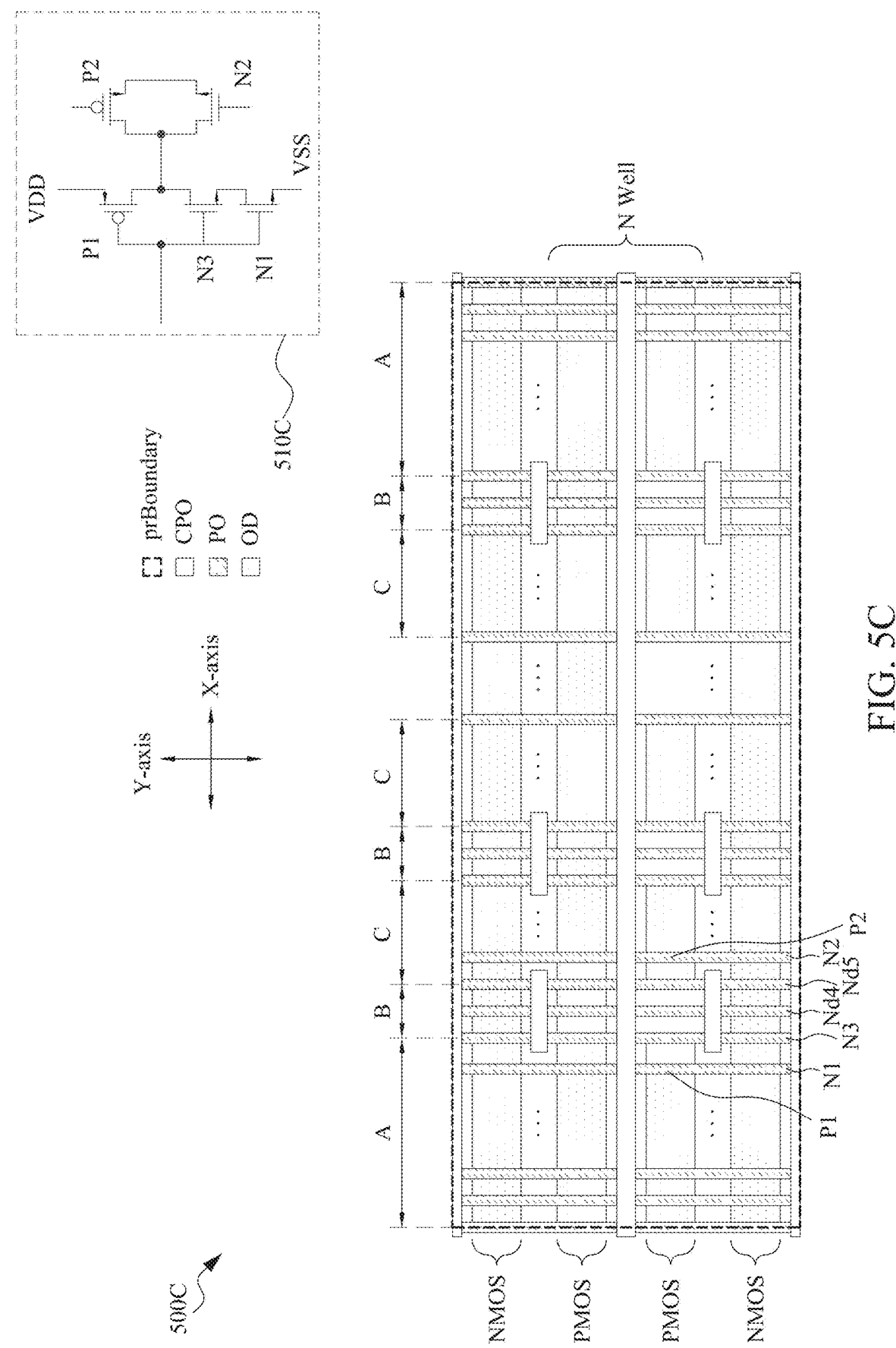

FIG. 5C is a schematic view of a layout diagram of a delay cell 500C in an IC device, in accordance with some embodiments. In at least one embodiment, the delay cell 500C corresponds to the delay circuitry 200B, or to a part of the delay circuitry 200B where the delay circuitry 200B comprises multiple delay cells. Corresponding elements in FIG. 5A and FIG. 5C are designated by the same reference numerals. In at least one embodiment, the layout diagram of the delay cell 500C is stored as a standard cell in a standard cell library on a non-transitory computer-readable medium.

The delay cell 500C is similar to the delay cell 500A, except that two of the gates N3-N5 are configured as dummy gates. For example, the gates N4, N5 in the delay cell 500A are configured as dummy gates Nd4, Nd5 in the delay cell 500C. As a result, a delay circuit 510C corresponding to the delay circuit 510A no longer includes the transistors N4, N5, and there is one additional transistor N3 electrically coupled in series to the transistor N1 in the delay circuit 510C. Compared to the delay circuit 510B, the delay circuit 510C has a smaller time delay. Nevertheless, in at least one embodiment, one or more advantages described herein with respect to the delay cell 500B are achievable in the delay cell 500C, compared to other approaches. In one or more embodiments, instead of the gates N4 and N5, another pair of gates N3 and N5, or N3 and N4, in the delay cell 500A are configured as dummy gates to obtain the delay cell 500C, with one or more similar advantages being achievable.

In at least one embodiment, it is possible to adjust the time delay of a delay circuit by switching from one delay circuit configuration (e.g., one of the delay circuits 510A, 510B, 510C) to another delay circuit configuration (e.g., another one of the delay circuits 510A, 510B, 510C). This time delay adjustability or customizability is a further advantage, in one or more embodiments.

Figure 5D:
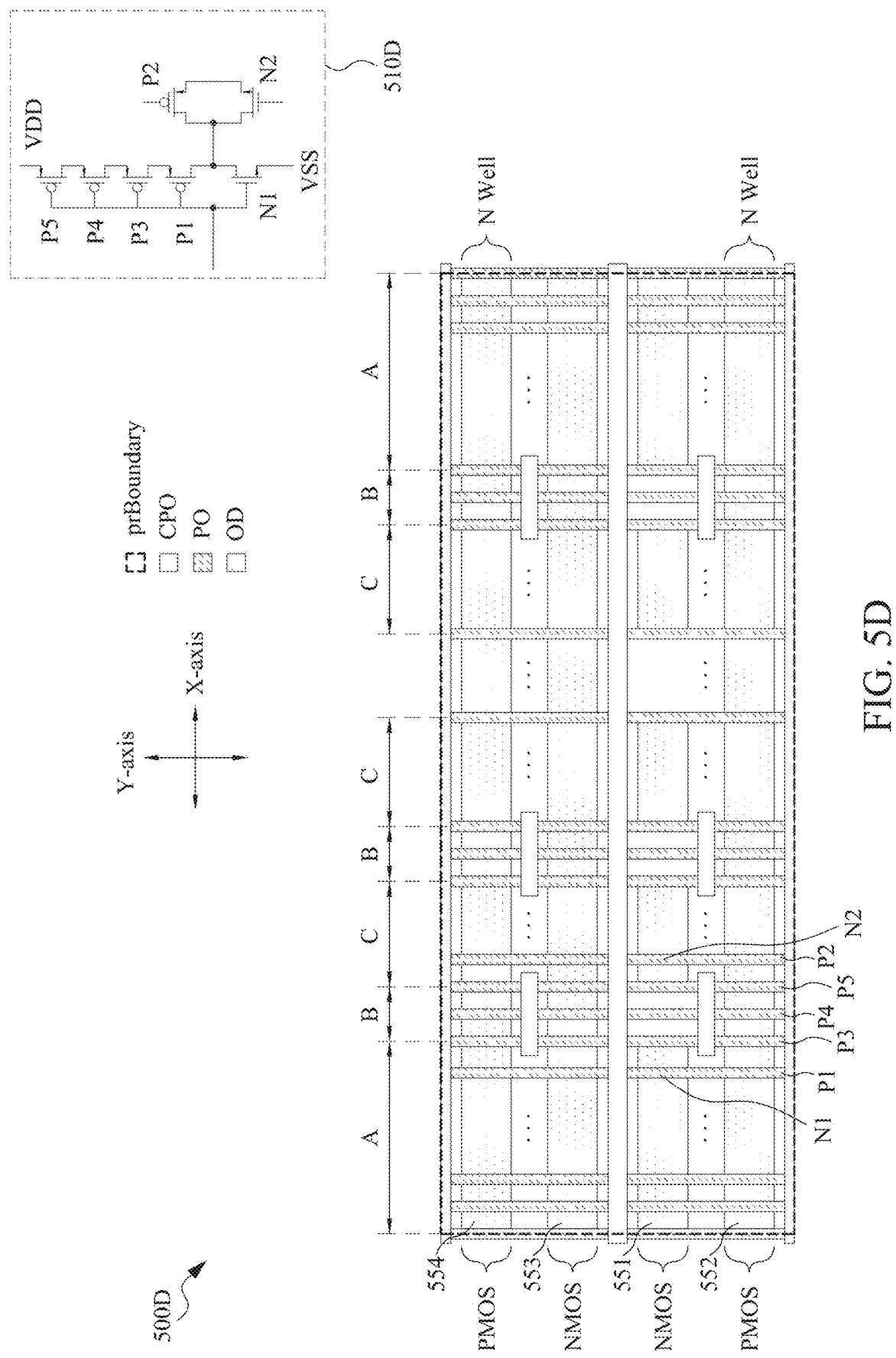

FIG. 5D is a schematic view of a layout diagram of a delay cell 500D in an IC device, in accordance with some embodiments. In at least one embodiment, the delay cell 500D corresponds to the delay circuitry 200B, or to a part of the delay circuitry 200B where the delay circuitry 200B comprises multiple delay cells. Corresponding elements in FIG. 5A and FIG. 5D are designated by the same reference numerals. In at least one embodiment, the layout diagram of the delay cell 500D is stored as a standard cell in a standard cell library on a non-transitory computer-readable medium.

The delay cell 500D is similar to the delay cell 500A, except that PMOS active regions and transistors in the delay cell 500A are replaced with NMOS active regions and transistors in the delay cell 500D, and NMOS active regions and transistors in the delay cell 500A are replaced with PMOS active regions and transistors in the delay cell 500D. For example, the delay cell 500D comprises NMOS active regions 551, 553 corresponding to the PMOS active regions 501, 503 of the delay cell 500A. The delay cell 500D further comprises PMOS active regions 552, 554 corresponding to the NMOS active regions 502, 504 of the delay cell 500A. The PMOS active regions 552, 554 of the delay cell 500D are formed in separate N wells, as illustrated in FIG. 5D.

The delay cell 500D comprises a delay circuit 510D corresponding to the delay circuit 510A. The delay circuit 510D comprises transistors P1, P2, N1, N2 electrically coupled together as described with respect to FIG. 2B. The delay circuit 510D comprises additional transistors P3-P5 electrically coupled in series with the transistor P1 in a manner similar to additional transistors N3-N5 electrically coupled in series with the transistor N1 in the delay circuit 510A. In at least one embodiment, one or more advantages described herein with respect to the delay cell 500A are achievable in the delay cell 500D.

Figure 5E:
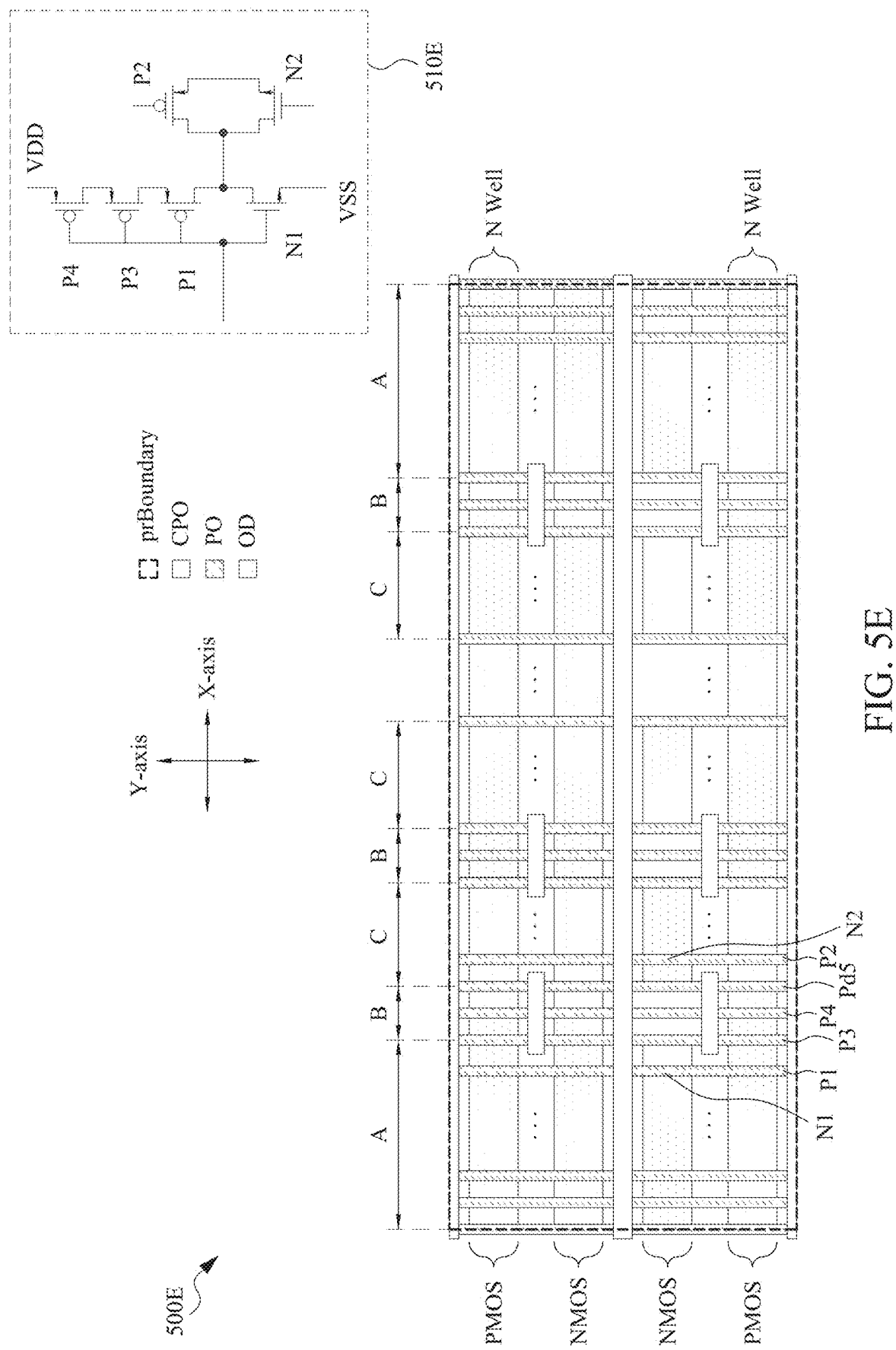

FIG. 5E is a schematic view of a layout diagram of a delay cell 500E in an IC device, in accordance with some embodiments. In at least one embodiment, the delay cell 500E corresponds to the delay circuitry 200B, or to a part of the delay circuitry 200B where the delay circuitry 200B comprises multiple delay cells. Corresponding elements in FIG. 5D and FIG. 5E are designated by the same reference numerals. In at least one embodiment, the layout diagram of the delay cell 500E is stored as a standard cell in a standard cell library on a non-transitory computer-readable medium.

The delay cell 500E is similar to the delay cell 500D, except that one of the gates P3-P5 is configured as a dummy gate. For example, the gate P5 in the delay cell 500D is configured as a dummy gate Pd5 in the delay cell 500E. As a result, a delay circuit 510E corresponding to the delay circuit 510D no longer includes the transistor P5, and there are two additional transistors P3, P4 electrically coupled in series to the transistor P1 in the delay circuit 510E. Compared to the delay circuit 510D, the delay circuit 510E has a smaller time delay. Nevertheless, in at least one embodiment, one or more advantages described herein with respect to the delay cell 500D are achievable in the delay cell 500E, compared to other approaches. In one or more embodiments, instead of the gate P5, either gate P3 or P4 in the delay cell 500D is configured as a dummy gate to obtain the delay cell 500E, with one or more similar advantages being achievable.

Figure 5F:
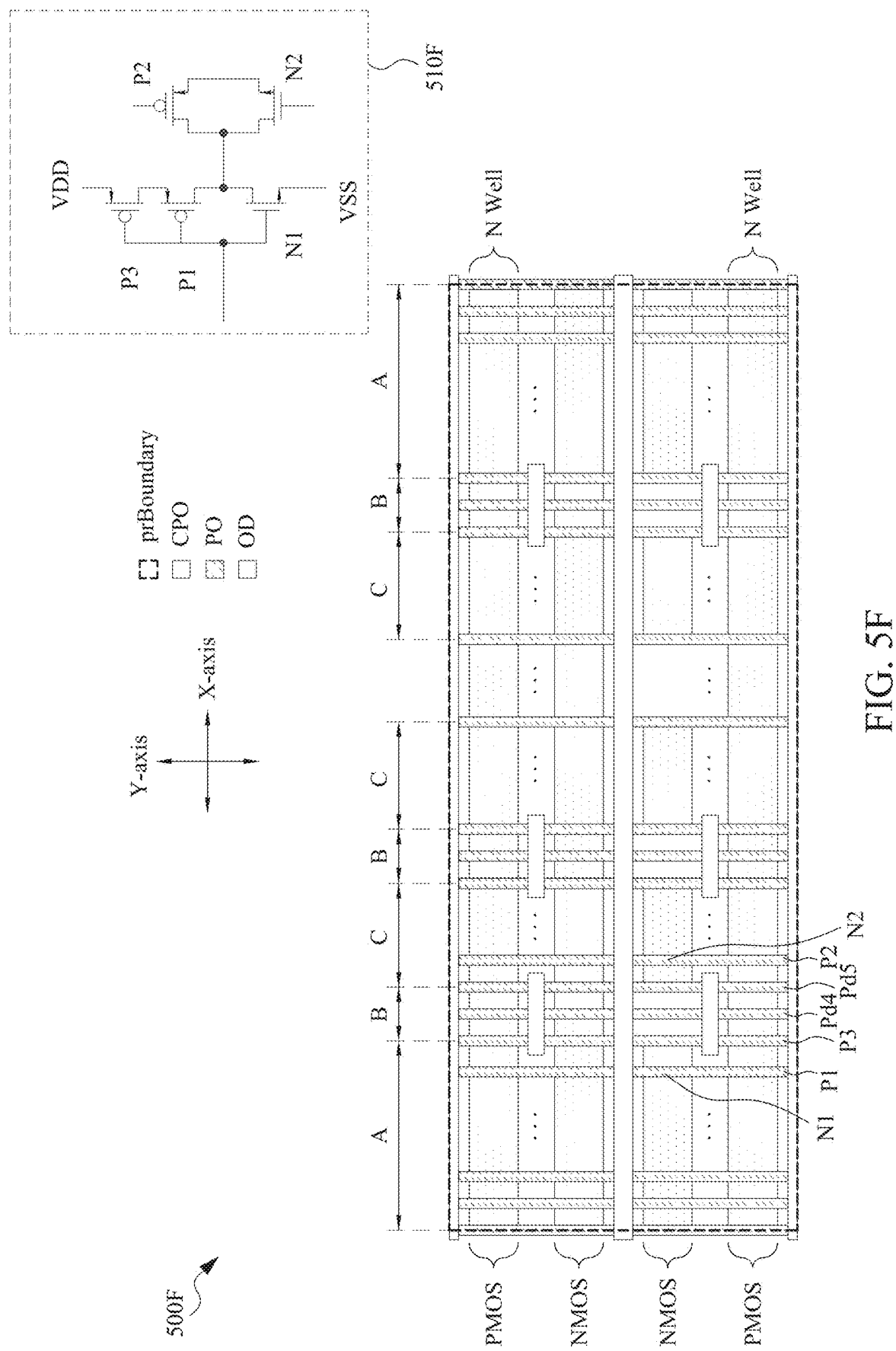

FIG. 5F is a schematic view of a layout diagram of a delay cell 500F in an IC device, in accordance with some embodiments. In at least one embodiment, the delay cell 500F corresponds to the delay circuitry 200B, or to a part of the delay circuitry 200B where the delay circuitry 200B comprises multiple delay cells. Corresponding elements in FIG. 5D and FIG. 5F are designated by the same reference numerals. In at least one embodiment, the layout diagram of the delay cell 500F is stored as a standard cell in a standard cell library on a non-transitory computer-readable medium.

The delay cell 500F is similar to the delay cell 500D, except that two of the gates P3-P5 are configured as dummy gates. For example, the gates P4, P5 in the delay cell 500D are configured as dummy gates Pd4, Pd5 in the delay cell 500F. As a result, a delay circuit 510F corresponding to the delay circuit 510D no longer includes the transistors P4, P5, and there is one additional transistor P3 electrically coupled in series to the transistor P1 in the delay circuit 510F. Compared to the delay circuit 510E, the delay circuit 510F has a smaller time delay. Nevertheless, in at least one embodiment, one or more advantages described herein with respect to the delay cell 500E are achievable in the delay cell 500F, compared to other approaches. In one or more embodiments, instead of the gates P4 and P5, another pair of gates P3 and P5, or P3 and P4, in the delay cell 500D are configured as dummy gates to obtain the delay cell 500F, with one or more similar advantages being achievable.

In at least one embodiment, it is possible to adjust the time delay of a delay circuit by switching from one delay circuit configuration (e.g., one of the delay circuits 510D, 510E, 510F) to another delay circuit configuration (e.g., another one of the delay circuits 510D, 510E, 510F). This time delay adjustability or customizability is a further advantage, in one or more embodiments.

Figure 6A:
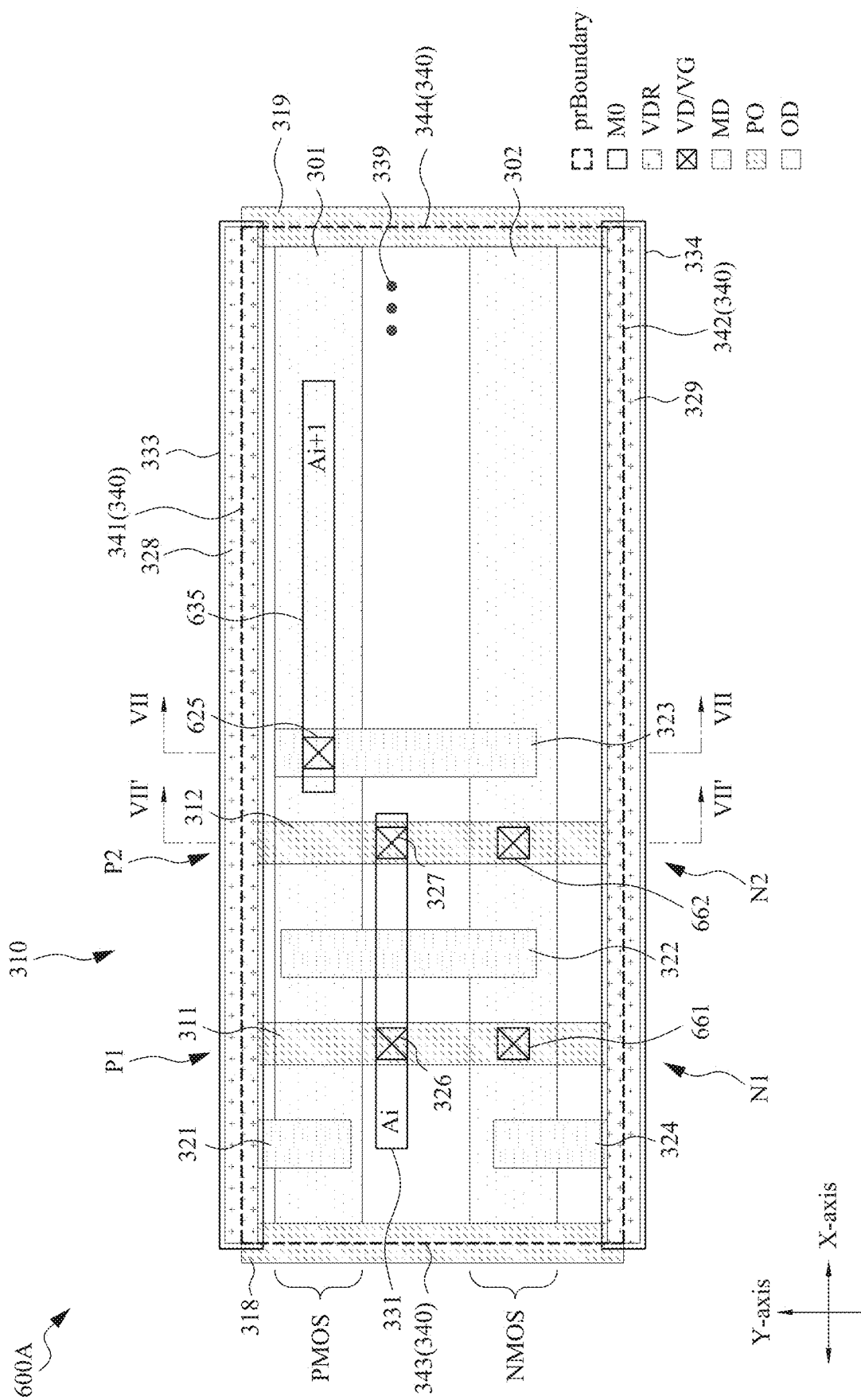
FIGS. 6A-6D are schematic views of layout diagrams of various delay cells in one or more IC devices, in accordance with some embodiments.

FIG. 6A is a schematic view of a layout diagram of a delay cell 600A in an IC device, in accordance with some embodiments. In at least one embodiment, the delay cell 600A corresponds to the delay circuitry 200B, or to a part of the delay circuitry 200B where the delay circuitry 200B comprises multiple delay cells. Corresponding elements in FIG. 3A and FIG. 6A are designated by the same reference numerals. In at least one embodiment, the layout diagram of the delay cell 600A is stored as a standard cell in a standard cell library on a non-transitory computer-readable medium.

As illustrated in FIG. 6A and described with respect to FIG. 3A, the delay cell 600A comprises a first active region 301 of a first semiconductor type (e.g., PMOS) and extending along the X-axis, a second active region 302 of a different second semiconductor type (e.g., NMOS) and also extending along the X-axis, and a plurality of gate regions 311, 312, 318, 319 extending along the Y-axis transverse to the X-axis and across the active regions 301, 302. The gate regions 311, 312 configure, together with the active regions 301, 302, a plurality of transistors P1, P2, N1, N2 which are electrically coupled into a delay circuit 310 configured to delay an input signal Ai at an input to generate a delayed signal Ai+1 at an output. The connections in the delay circuit 310 are established by various MD contact structures 321, 322, 323, 324, VD rails 328, 329, a VDD power rail configured by an M0 conductive pattern 333, a VSS power rail configured by an M0 conductive pattern 334, VG via structures 326, 327 electrically coupling the corresponding gate regions 311, 312 to the input configured by an M0 conductive pattern 331, and a VD via structure 625 electrically coupling the MD contact structure 323 to the output configured by an M0 conductive pattern 635. The delay cell 600A has a boundary 340 as described with respect to FIG. 3A.

A difference between the delay cell 600A and the delay cell 300A is that an output connector of the delay cell 300A as described with respect to FIG. 3A is not included in the delay cell 600A. The output of the delay circuit 310 is configured by the M0 conductive pattern 635 which, in at least one embodiment, is also the input to a succeeding delay circuit. The delay cell 600A achieves an increased time delay by a different configuration.

Specifically, in addition to the VG via structures 326, 327 which are over and in electrical contact with the corresponding gate regions 311, 312 to electrically couple the gate regions 311, 312 to the M0 conductive pattern 331, the delay cell 600A further comprises at least one VG via structure (referred to herein as "dummy VG via structure") which is also over and in electrical contact with a gate region but is free of direct electrical contact with a conductive element other than the gate electrode. For example, the delay cell 600A further comprises dummy VG via structures 661, 662 over and in electrical contact with the corresponding gate regions 311, 312. However, besides the corresponding gate regions 311, 312, the dummy VG via structures 661, 662 are not electrically coupled to any other circuit element. In at least one embodiment, a dummy VG via structure is not configured to electrically coupled the corresponding gate region to another circuit element; rather, the dummy VG via structure is configured to change a stress on an active region over which the dummy VG via structure is arranged. In the example configuration in FIG. 6A, the dummy VG via structures 661, 662 are arranged over the active region 302 and change a stress on the active region 302. As a result, in at least one embodiment, a threshold voltage of the transistors N1, N2, configured by the active region 302 and the gate regions 311, 312 over which the dummy VG via structures 661, 662 are arranged, is increased. The increased threshold voltage of the transistors N1, N2 causes an increase in the time delay of the delay circuit 310 in the delay cell 600A, in one or more embodiments. One or more advantages associated with the increased time delay of a delay circuit are therefore achievable in the delay cell 600A in accordance with some embodiments.

Figure 6B:
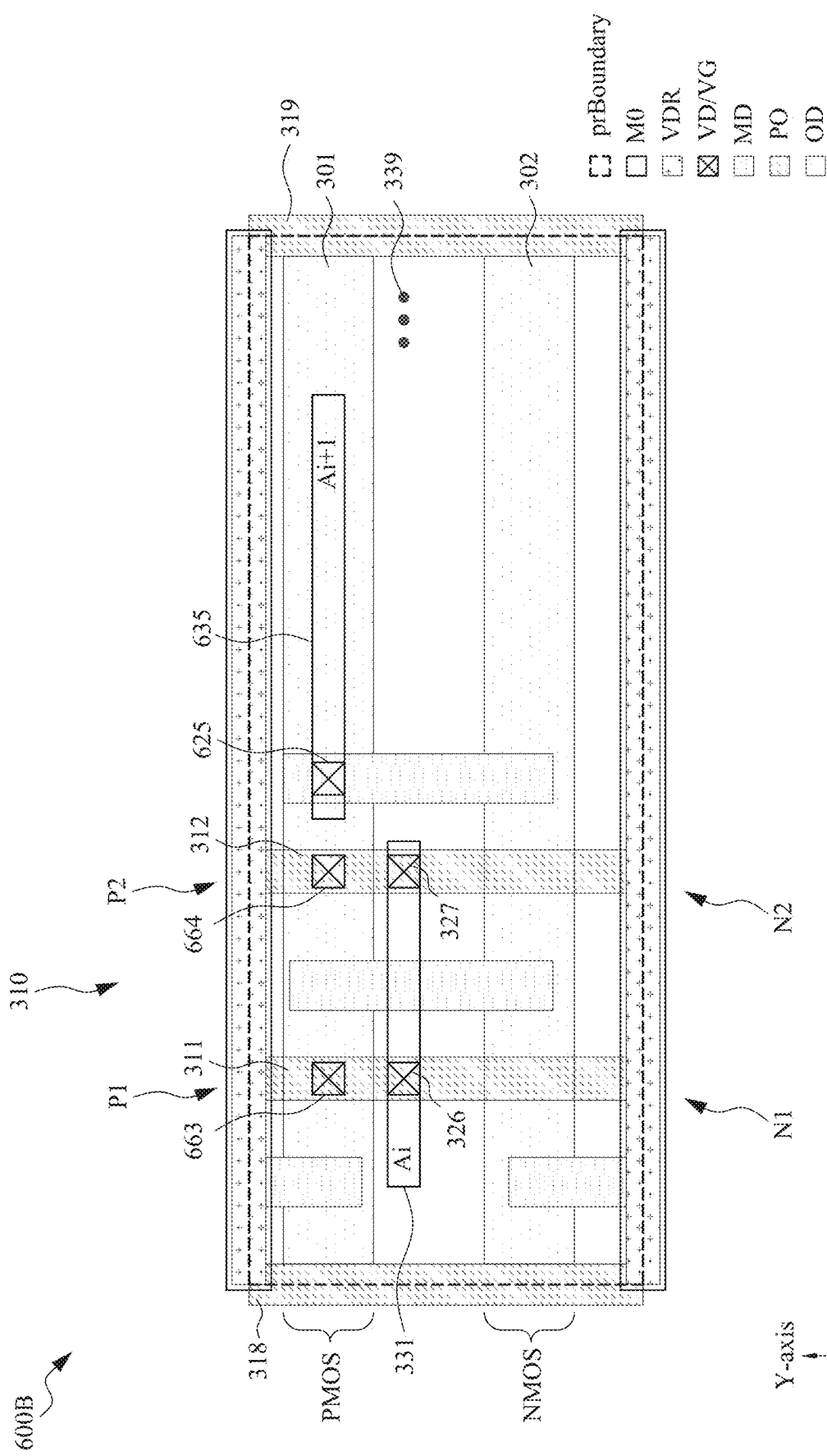

FIG. 6B is a schematic view of a layout diagram of a delay cell 600B in an IC device, in accordance with some embodiments. In at least one embodiment, the delay cell 600B corresponds to the delay circuitry 200B, or to a part of the delay circuitry 200B where the delay circuitry 200B comprises multiple delay cells. Corresponding elements in FIG. 6A and FIG. 6B are designated by the same reference numerals. In at least one embodiment, the layout diagram of the delay cell 600B is stored as a standard cell in a standard cell library on a non-transitory computer-readable medium.

The delay cell 600B differs from the delay cell 600A in locations of dummy VG via structures. Specifically, in the delay cell 600A, the dummy VG via structures 661, 662 are arranged over the NMOS active region 302 to increase the threshold voltage of the corresponding NMOS transistors N1, N2. In the delay cell 600B, dummy VG via structures 663, 664 are formed over the corresponding gate regions 311, 312 and over the PMOS active region 301 to increase the threshold voltage of the corresponding PMOS transistors P1, P2. As a result, the time delay of the delay circuit 310 in the delay cell 600B is increased and one or more advantages associated with the increased time delay of a delay circuit are therefore achievable in the delay cell 600B, in accordance with some embodiments.

Figure 6C:
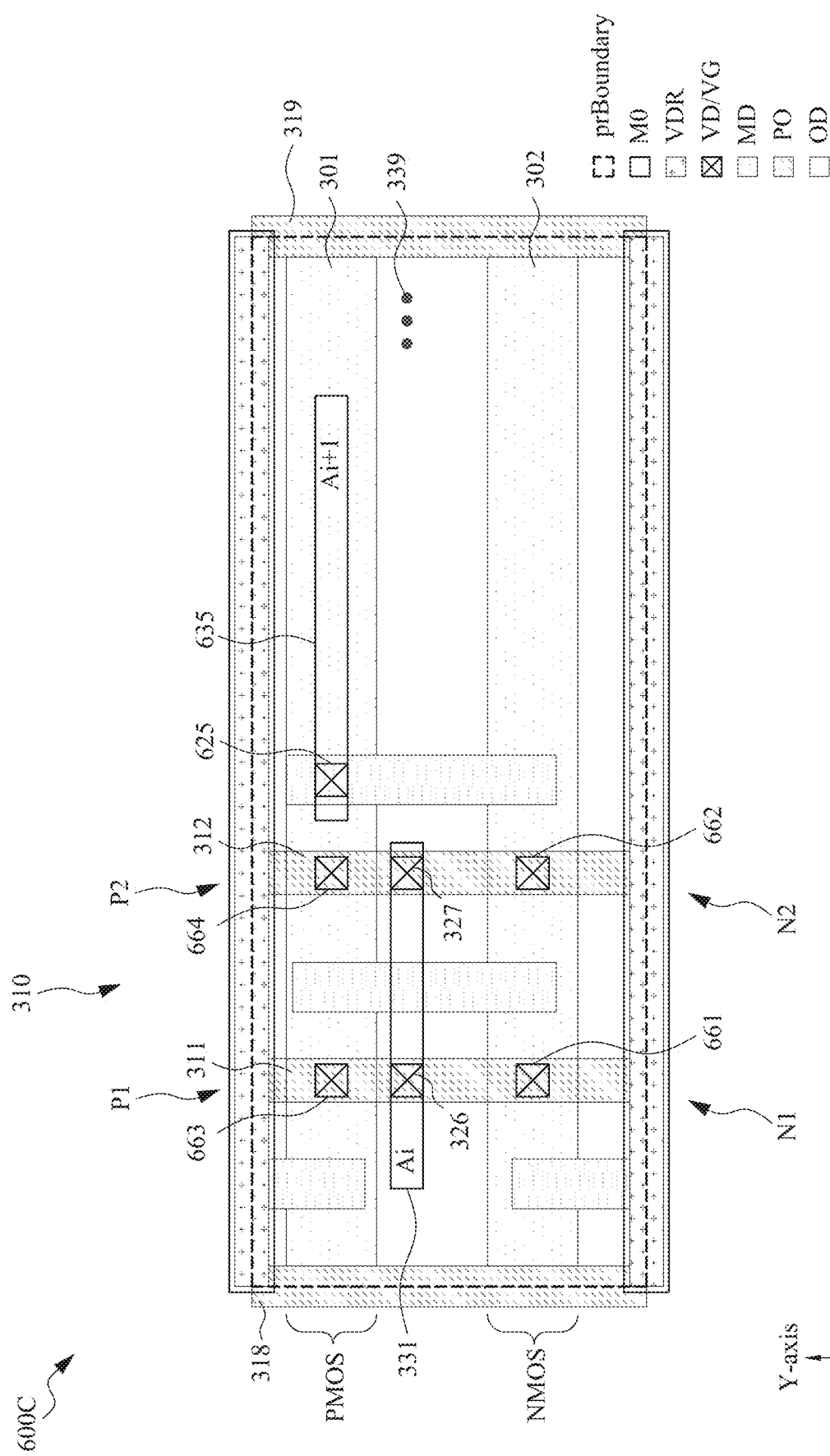

FIG. 6C is a schematic view of a layout diagram of a delay cell 600C in an IC device, in accordance with some embodiments. In at least one embodiment, the delay cell 600C corresponds to the delay circuitry 200B, or to a part of the delay circuitry 200B where the delay circuitry 200B comprises multiple delay cells. Corresponding elements in FIGS. 6A-6B and in FIG. 6C are designated by the same reference numerals. In at least one embodiment, the layout diagram of the delay cell 600C is stored as a standard cell in a standard cell library on a non-transitory computer-readable medium.

The delay cell 600C differs from the delay cells 600A, 600B in locations of dummy VG via structures. Specifically, in each of the delay cells 600A, 600B, dummy VG via structures are arranged over one active region 301 or 302. In the delay cell 600C, dummy VG via structures 661, 662, 663, 664 are formed over both active regions 301, 302 to increase the threshold voltage of the transistors P1, P2, N1, N2. As a result, the time delay of the delay circuit 310 in the delay cell 600C is increased and one or more advantages associated with the increased time delay of a delay circuit are therefore achievable in the delay cell 600C, in accordance with some embodiments.

In the example configurations in FIGS. 6A-6C, one dummy VG via structure is arranged over a gate region over an active region. For example, as illustrated in FIG. 6C, one dummy VG via structure 662 is arranged over the gate region 312 over the active region 302. However, in some embodiments, multiple dummy VG via structures are arranged over a gate region over an active region. For example, in addition to the dummy VG via structure 662, in one or more embodiments, the delay circuit further includes one or more other dummy VG via structures also over the gate region 312 over the active region 302. In at least one embodiment, the increased number of dummy VG via structure over a gate region over an active region leads to a further increase in the threshold voltage of the corresponding transistor which results in an associated further increase in the time delay of the delay circuit or delay cell.

In at least one embodiment, it is possible to adjust the time delay of a delay circuit and the corresponding delay cell, by selecting whether to arrange dummy VG via structures and/or how many dummy VG via structures to arrange over which (i.e., PMOS and/or NMOS) active region. This time delay adjustability or customizability is a further advantage, in one or more embodiments.

Figure 6D:
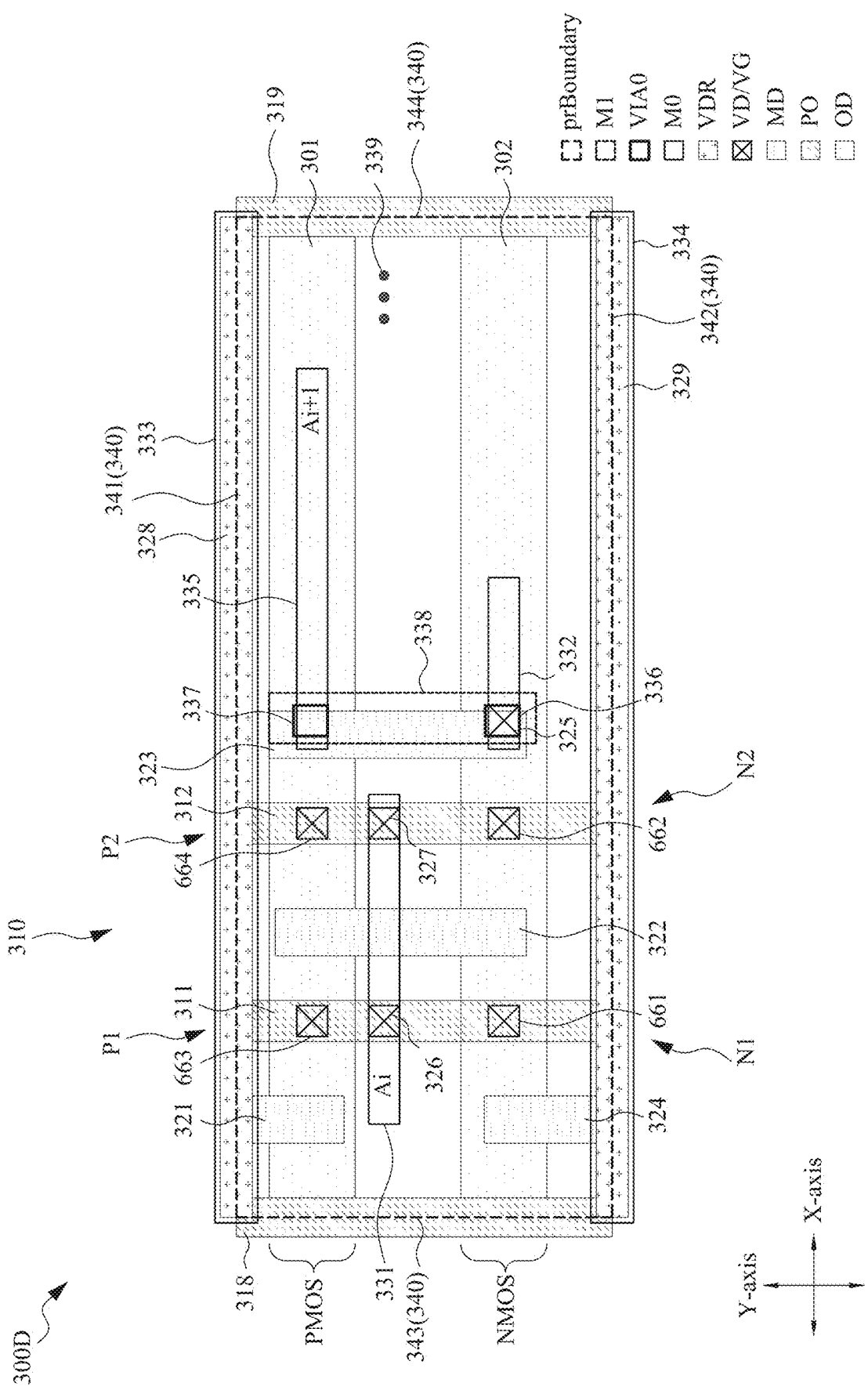

FIG. 6D is a schematic view of a layout diagram of a delay cell 600D in an ID device, in accordance with some embodiments. In at least one embodiment, the delay cell 600D corresponds to the delay circuitry 200B, or to a part of the delay circuitry 200B where the delay circuitry 200B comprises multiple delay cells. Corresponding elements in FIG. 6C and in FIG. 6D are designated by the same reference numerals. In at least one embodiment, the layout diagram of the delay cell 600D is stored as a standard cell in a standard cell library on a non-transitory computer-readable medium.

Compared to the delay cell 300A, the delay cell 600D additionally comprises dummy VG via structures 661, 662, 663, 664. Thus, the delay cell 600D comprises both an output connector as described with respect to FIG. 3A and dummy VG via structures as described with respect to FIG. 6C. Other configurations are within the scopes of various embodiments. For example, in some embodiments, one or more dummy VG via structures are arranged over one or more active regions in one or more of the delay cells described with respect to FIGS. 3A-3D, 5A-5F to achieve one or more advantages described herein.

Figure 7A:
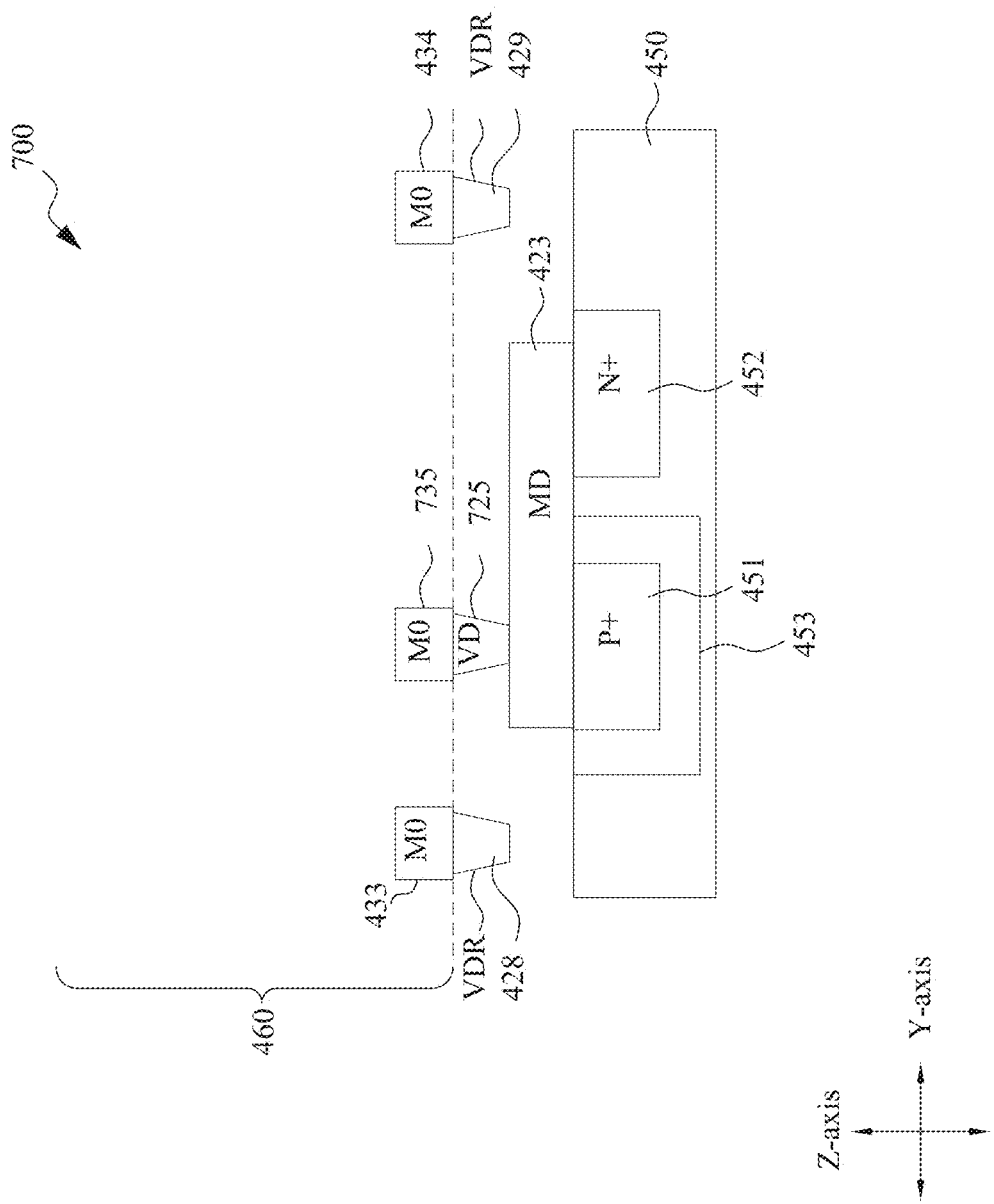
FIG. 7A is a schematic cross-sectional view, taken along line VII-VII in FIG. 6A, of an IC device, in accordance with some embodiments.

FIG. 7A is a schematic cross-sectional view, taken along line VII-VII in FIG. 6A, of an IC device 700, in accordance with some embodiments. Corresponding elements in FIG. 4A and FIG. 7A are designated by the same reference numerals.

As illustrated in FIG. 7A and described with respect to FIG. 4A, the IC device 700 comprises a substrate 450 having therein a P-doped region 451 in an N well 453, and an N-doped regions 452. An MD contact structure 423 is an extended contact structure over and electrically coupling the P-doped region 451 and N-doped regions 452. The MD contact structure 423 is electrically coupled to a VD via structure 725 corresponding to the VD via structure 625 in FIG. 6A. The VD via structure 725 is further electrically coupled to an M0 conductive pattern 735 corresponding to the output of the delay circuit 310 in FIG. 6A. The IC device 700 further comprises VD rails 428, 429 and corresponding power rails such as M0 conductive patterns 433, 434 in the M0 layer as described with respect to FIG. 4A. As illustrated in FIGS. 4A, 7A, the IC device 700 is different from the IC device 400 in that an output connector comprising an M1 conductive pattern of the IC device 400 is not included in the IC device 700.

Figure 7B:
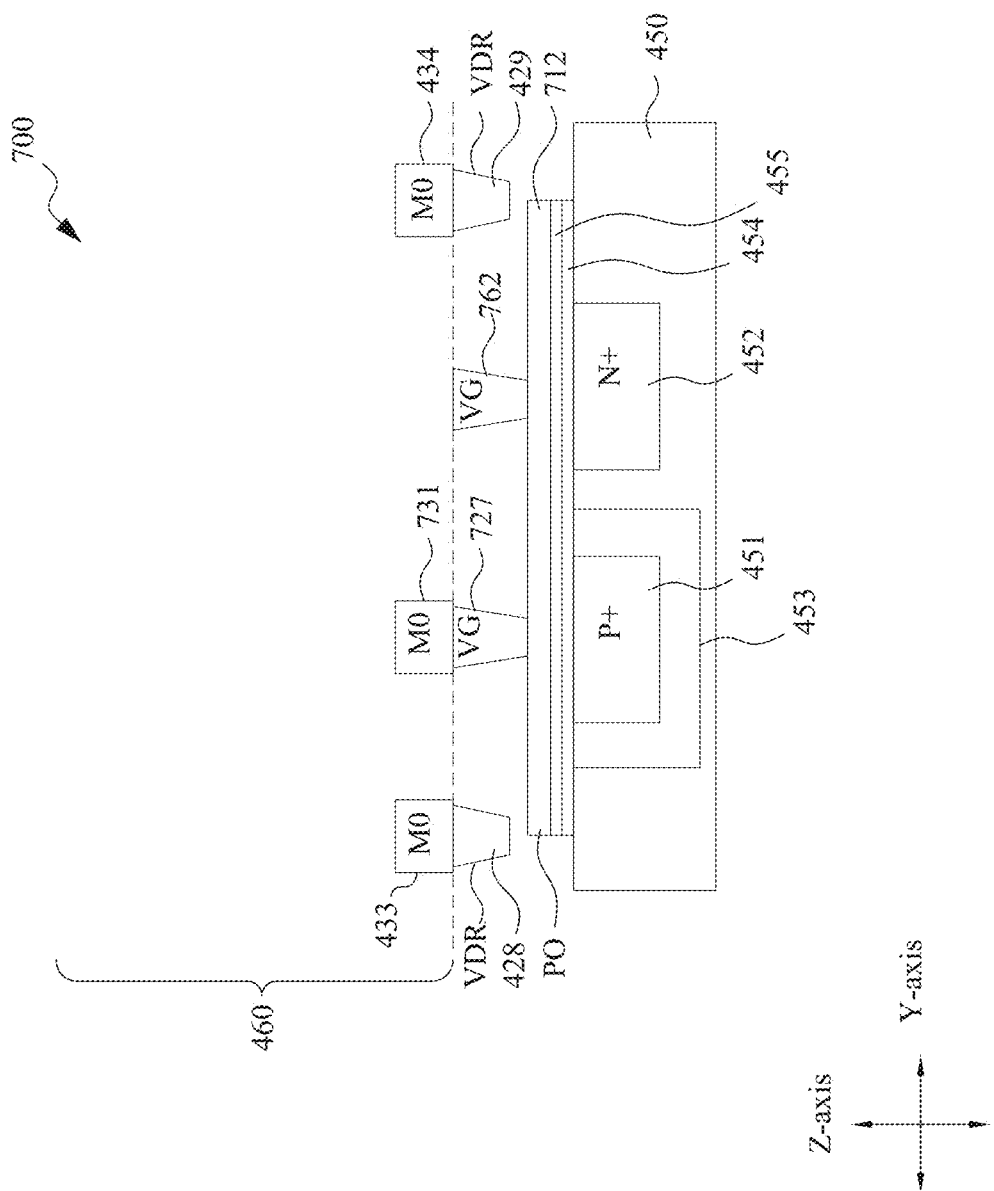
FIG. 7B is a schematic cross-sectional view, taken along line VII'-VII' in FIG. 6A, of an IC device, in accordance with some embodiments.

FIG. 7B is a schematic cross-sectional view, taken along line VII'-VII' in FIG. 6A, of the IC device 700, in accordance with some embodiments. Corresponding elements in FIG. 4B and FIG. 7B are designated by the same reference numerals. Components in FIG. 7B having corresponding components in FIG. 4B are designated by the reference numerals.

As illustrated in FIG. 7B, the IC device 700 further comprises a gate stack including gate dielectric layers 454, 455, and a gate electrode 712 corresponding to the gate region 312 in FIG. 6A. The VD rails 728, 729 fly over, but are not in electrical contact with, the gate electrode 712. A VG via structure 727 corresponding to the VG via structure 327 in FIG. 6A electrically couples the gate electrode 712 to an M0 conductive pattern 731 corresponding to the input of the delay circuit 310 such as M0 conductive pattern 331 in FIG. 6A. A dummy VG via structure 762 corresponding to the dummy VG via structure 662 in FIG. 6A is over and in electrical contact with the gate electrode 712. As illustrated in FIG. 7B, the dummy VG via structure 762 is free of direct electrical contact with a conductive element other than the gate electrode 712. In at least one embodiment, one or more advantages described herein with respect to FIG. 6A are achievable in the IC device 700.

Figure 8A:
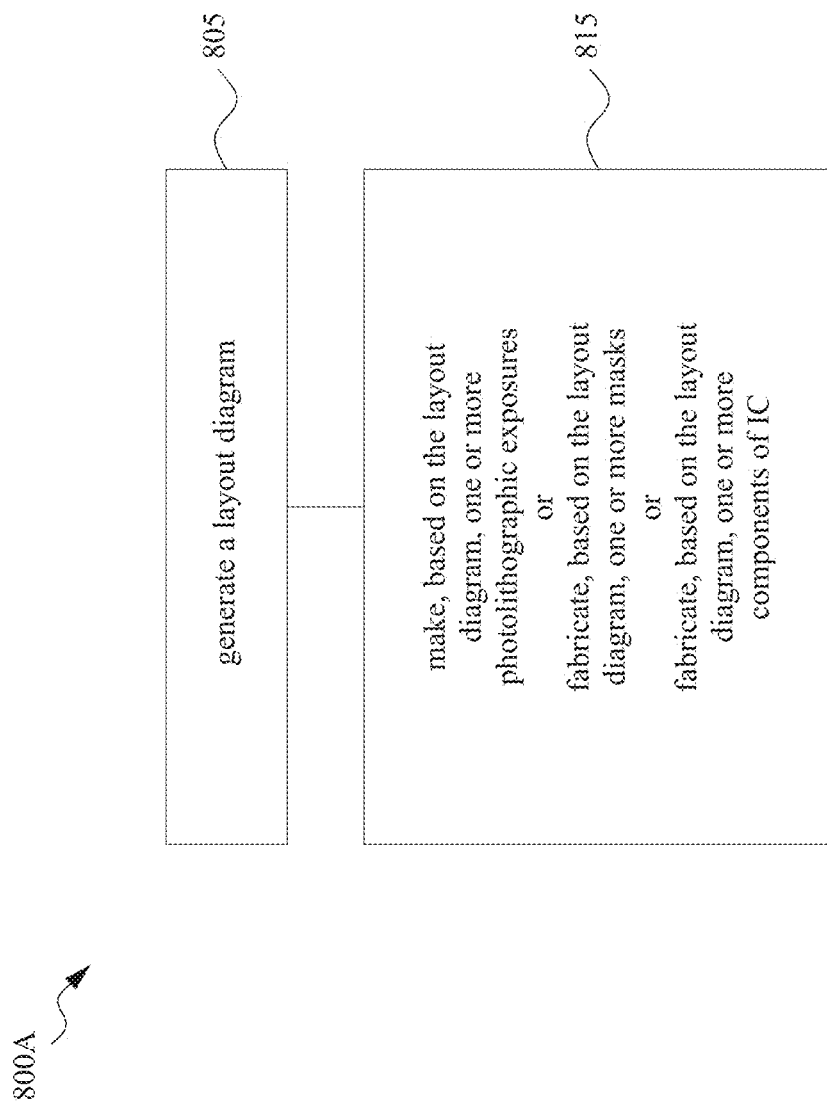
FIGS. 8A-8C are flowcharts of various methods, in accordance with some embodiments.

FIG. 8A is a flowchart of a method 800A of generating a layout diagram and using the layout diagram to manufacture an IC device, in accordance with some embodiments.

Method 800A is implementable, for example, using EDA system 900 (FIG. 9, discussed below) and an integrated circuit (IC) manufacturing system 1000 (FIG. 10, discussed below), in accordance with some embodiments. Regarding method 800A, examples of the layout diagram include the layout diagrams disclosed herein, or the like. Examples of an IC device to be manufactured according to method 800A include IC devices 400, 700. In FIG. 8A, method 800A includes blocks 805, 815.

At block 805, a layout diagram is generated which, among other things, include patterns represent one or more circuit regions, circuitry, circuits or cells as described with respect to FIGS. 3A-3D, 5A-5F, 6A-6D or the like. An example of an IC device corresponding to a layout diagram generated by block 805 includes IC device 100, 400 or 700. Block 805 is discussed in more detail below with respect to FIG. 8B. From block 805, flow proceeds to block 815.

At block 815, based on the layout diagram, at least one of (A) one or more photolithographic exposures are made or (b) one or more semiconductor masks are fabricated or (C) one or more components in a layer of an IC device are fabricated. Block 815 is discussed in more detail below with respect to FIG. 8C.

Figure 8B:
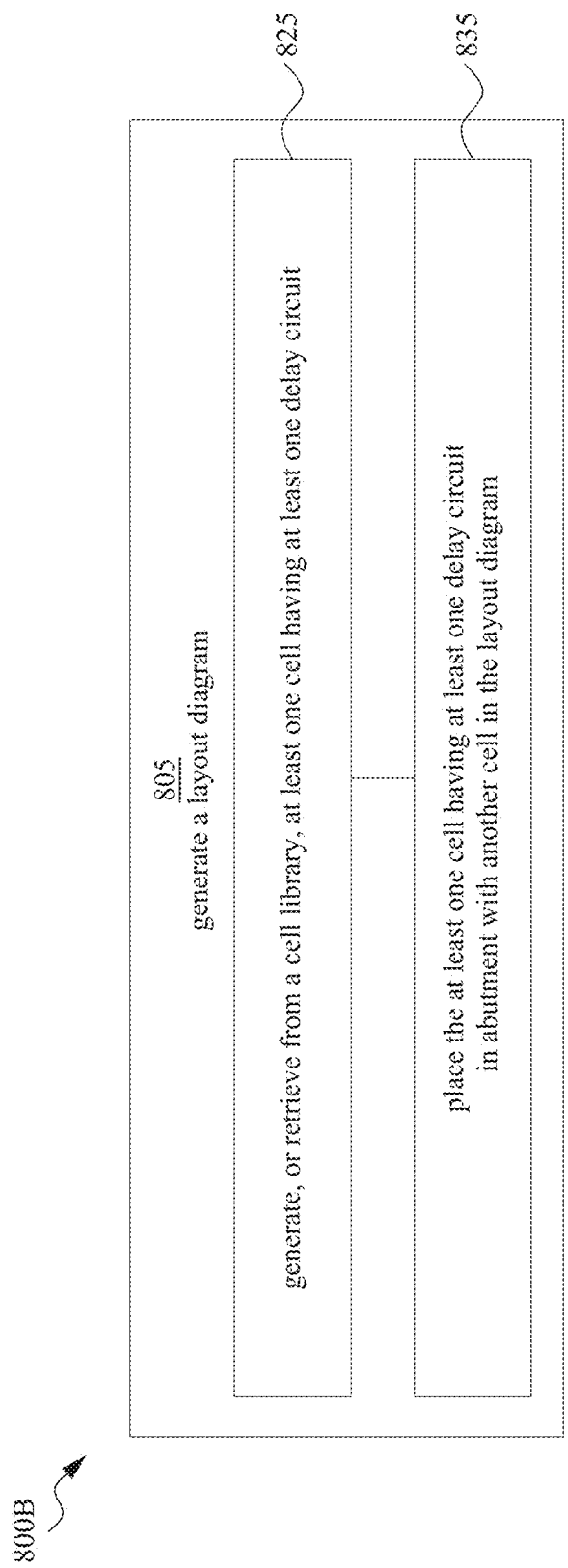

FIG. 8B is a flowchart of a method 800B of generating a layout diagram, in accordance with some embodiments. More particularly, the flowchart of FIG. 8B shows additional blocks that demonstrates one example of procedures implementable in block 805 of FIG. 8A, in accordance with one or more embodiments. In FIG. 8B, block 805 includes blocks 825, 835.

At block 825, at least one cell having at least one delay circuit is generated, or retrieved from a cell library. For example, a delay cell corresponding to one or more of the layout diagrams described with respect to FIGS. 3A-3D, 5A-5F, 6A-6D is generated, or retrieved from a cell library. In at least one embodiment, the delay cell is selected to be retrieved or generated based on a time delay required for satisfying a timing requirement and/or various customizable/selectable configurations as described herein.

At block 835, the at least one cell having at least one delay circuit is placed in abutment with another cell in the layout diagram. In some embodiments, multiple delay cells are placed in abutment to serially couple the delay circuits of the multiple abutted delay cells to achieve a required time delay. In at least one embodiment, the generated layout diagram of the IC device is stored on a non-transitory computer-readable medium.

Figure 8C:
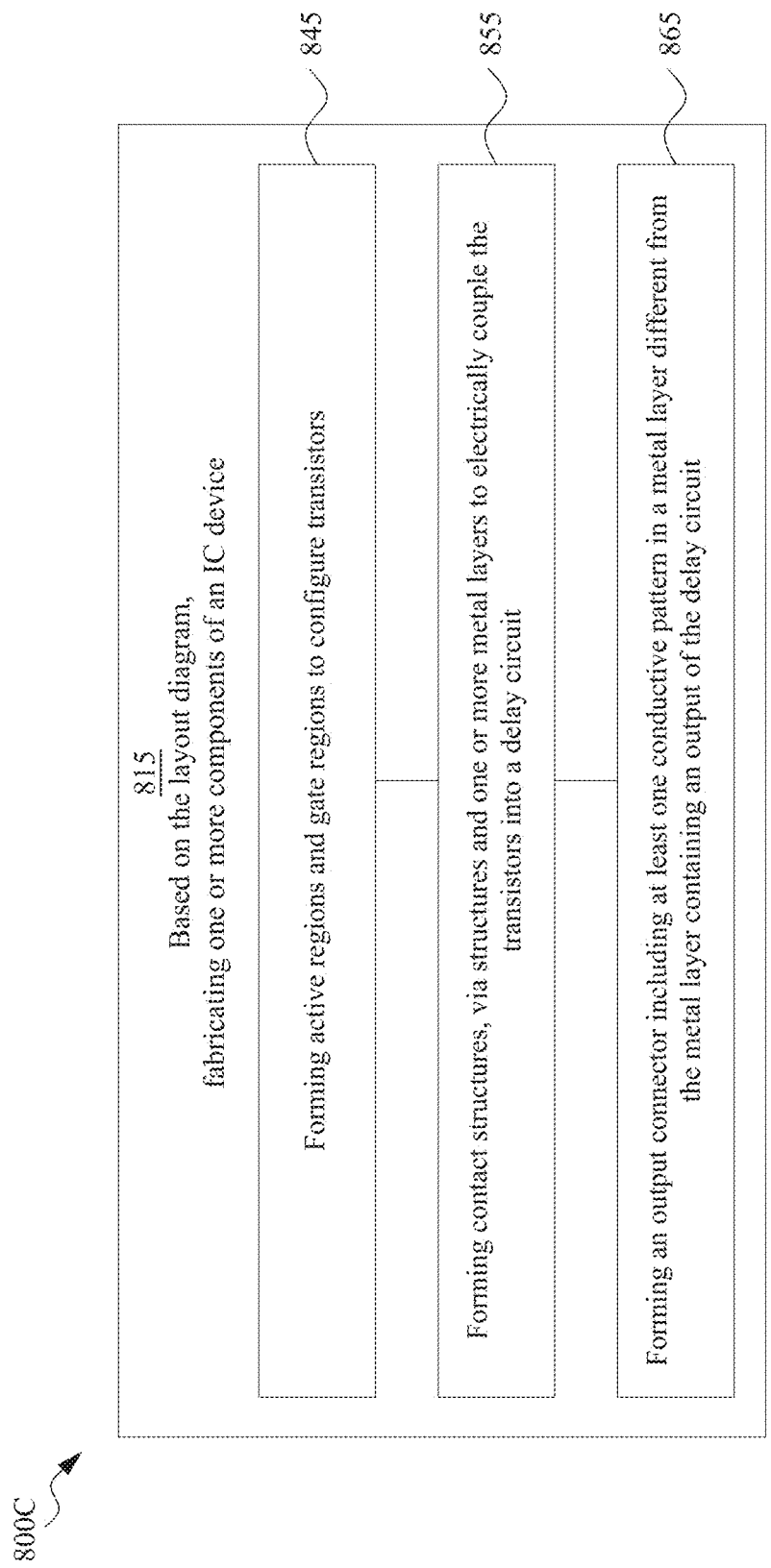

FIG. 8C is a flowchart of a method 800C of fabricating one or more components of an IC device, based on the layout diagram, in accordance with some embodiments. More particularly, the flowchart of FIG. 8C shows additional blocks that demonstrates one example of procedures implementable in block 815 of FIG. 8A, in accordance with one or more embodiments. In FIG. 8C, block 815 includes blocks 845, 855, 865.

At block 845, active regions and gate regions are formed over a substrate to configure a plurality of transistors. In some embodiments, the active regions, gate regions and/or transistors correspond to one or more of the active regions, gate regions and/or transistors described with respect to FIGS. 2B-7B.

An example manufacturing process starts from a substrate, such as the substrate 450 described with respect to FIG. 4A. The substrate comprises, in at least one embodiment, silicon, silicon germanium (SiGe), gallium arsenic, or other suitable semiconductor materials. Active regions are formed in or over the substrate, using one or more masks corresponding to one or more active regions in the layout diagrams described herein. A gate dielectric material layer is deposited over the substrate. Example materials of the gate dielectric material layer include, but are not limited to, a high-k dielectric layer, an interfacial layer, and/or combinations thereof. In some embodiments, the gate dielectric material layer is deposited over the substrate by atomic layer deposition (ALD) or other suitable techniques. A gate electrode layer is deposited over the gate dielectric material layer. Example materials of the gate electrode layer include, but are not limited to, polysilicon, metal, Al, AlTi, Ti, TiN, TaN, Ta, TaC, TaSiN, W, WN, MoN, and/or other suitable conductive materials. In some embodiments, the gate electrode layer is deposited by chemical vapor deposition (CVD), physical vapor deposition (PVD or sputtering), plating, atomic layer deposition (ALD), and/or other suitable processes. A patterning process is then performed, using one or more masks corresponding to one or more gate electrodes in the layout diagrams described herein. As a result, the gate dielectric material layer is patterned in to one or more gate dielectric layers, such as the gate dielectric layers 454, 455, and the gate electrode layer is patterned into one or more gate electrodes, such as the gate electrode 411 described with respect to FIG. 4B. In at least one embodiment, spacers are formed, by deposition and patterning, on opposite sides of each gate electrode. Example materials of the spacers include, but are not limited to, silicon nitride, oxynitride, silicon carbide and other suitable materials. Example deposition processes include, but are not limited to, plasma enhanced chemical vapor deposition (PECVD), low-pressure chemical vapor deposition (LPCVD), sub-atmospheric chemical vapor deposition (SACVD), atomic layer deposition (ALD), or the like. Example patterning processes include, but are not limited to, a wet etch process, a dry etch process, or combinations thereof. Drain/source regions, such as the doped regions 451, 452 described with respect to FIG. 4A, are formed in the active regions of the substrate. In at least one embodiment, the drain/source regions are formed by using the gate electrodes and the spacers as a mask. For example, the formation of the drain/source regions is performed by an ion implantation or a diffusion process. Depending on the type of the devices or transistors, the drain/source regions are doped with p-type dopants, such as boron or $BF_2$, n-type dopants, such as phosphorus or arsenic, and/or combinations thereof.

In some embodiments, at least one of the active regions is formed as a discontinuous active region, for example, as described with respect to FIGS. 5A-5F. As a result, one or more advantages associated with discontinuous active regions, e.g., increased time delays and/or increased delay cell efficiency, are achievable in at least one embodiment. In some embodiments, the formation of discontinuous active regions is omitted.

At block 855, contact structures, via structures and one or more metal layers are formed to electrically couple the transistors into a delay circuit. In some embodiments, the delay circuit corresponds to one or more delay circuits described with respect to FIGS. 2A-2C, and the contact structures, via structures and one or more metal layers that electrically couple the transistors into the delay circuit correspond to one or more contact structures, via structures and metal layers described with respect to FIGS. 3A-7B.

In an example manufacturing process, a conductive layer, e.g., a metal, is deposited over the substrate with the transistors formed thereon, thereby making electrical connections to the drain/source regions of the transistors. A planarizing process is performed to planarize the conductive layer, resulting in contact structures, such as the MD contact structures 421, 423 described with respect to FIGS. 4A, 4B, in electrical contact with the underlying drain/source regions. The planarizing process comprises, for example, a chemical mechanical polish (CMP) process. A dielectric layer is deposited over the substrate with the drain/source contacts formed thereon. The dielectric layer is etched, and the etched portions are filled with a conductive material, such as a metal, to form one or more via structures, such as the VD and VG via structures 425, 725, 727, 762 described with respect to FIGS. 4A, 7A, 7B. In some embodiments, VD rails, such as VD rails 428, 429 described with respect to FIGS. 4A, 4B, are also formed together with VD via structures. A planarizing process is performed. An M0 layer including a conductive material, such as a metal, is deposited over the planarized structure and patterned to form various M0 conductive patterns, such as the M0 conductive patterns 432-435 described with respect to FIGS. 4A-4B. In the example configurations described herein, an output of the delay circuit is an M0 conductive pattern in the M0 layer. However, other delay circuit configurations where the output of the delay circuit is in a metal layer different from the M0 layer are within the scopes of various embodiments.

In some embodiments, while forming VD, VG via structures that electrically couple the transistors into a delay circuit, one or more dummy VG via structures are also formed over one or more gate regions and active regions, for example, as described with respect to FIGS. 6A-6D, to change a stress on the underlying active regions. As a result, one or more advantages associated with dummy VG via structures, e.g., increased time delays and/or increased delay cell efficiency, are achievable in at least one embodiment. In some embodiments, the formation of dummy VG via structures is omitted.

At block 865, an output connector is formed to include at least one conductive pattern in a metal layer different from the metal layer containing an output of the delay circuit. In some embodiments, the output connector comprises an M1 conductive pattern in the M1 layer different from the M0 layer in which the output of the delay circuit is arranged, for example, as described with respect to FIGS. 3A-4B. Other delay circuit configurations where the output connector comprises a conductive pattern in a metal layer different from the M1 layer are within the scopes of various embodiments.

In an example manufacturing process, a dielectric layer is deposited over the patterned M0 layer. The dielectric layer is etched, and the etched portions are filled with a conductive material, such as a metal, to form one or more via structures in a VIA0 layer. For example, the VIA0 layer comprises the VIA0 via structures 436, 437 described with respect to FIG. 4A. A planarizing process is then performed. An M1 layer including a conductive material, such as a metal, is deposited over the planarized structure obtained at the end of the formation of the VIA0 layer. The M1 layer is patterned to form various M1 conductive patterns, such as the M1 conductive pattern 438 described with respect to FIG. 4A. The M1 conductive pattern 438 and the VIA0 via structures 436, 437 electrically couple the M0 conductive pattern 432, which is the output of the delay circuit, to a further M0 conductive pattern 435, as described with respect to FIG. 4A. An output connector 416 is thus obtained.

In some embodiments, the output connector increases the resistance and/or capacitance at the output of the delay circuit. As a result, one or more advantages associated with such increased resistance and/or capacitance, e.g., increased time delays and/or increased delay cell efficiency, are achievable in at least one embodiment. In some embodiments, the formation of an output connector is omitted.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, at least one method(s) discussed above is performed in whole or in part by at least one EDA system. In some embodiments, an EDA system is usable as part of a design house of an IC manufacturing system discussed below.

Figure 9:
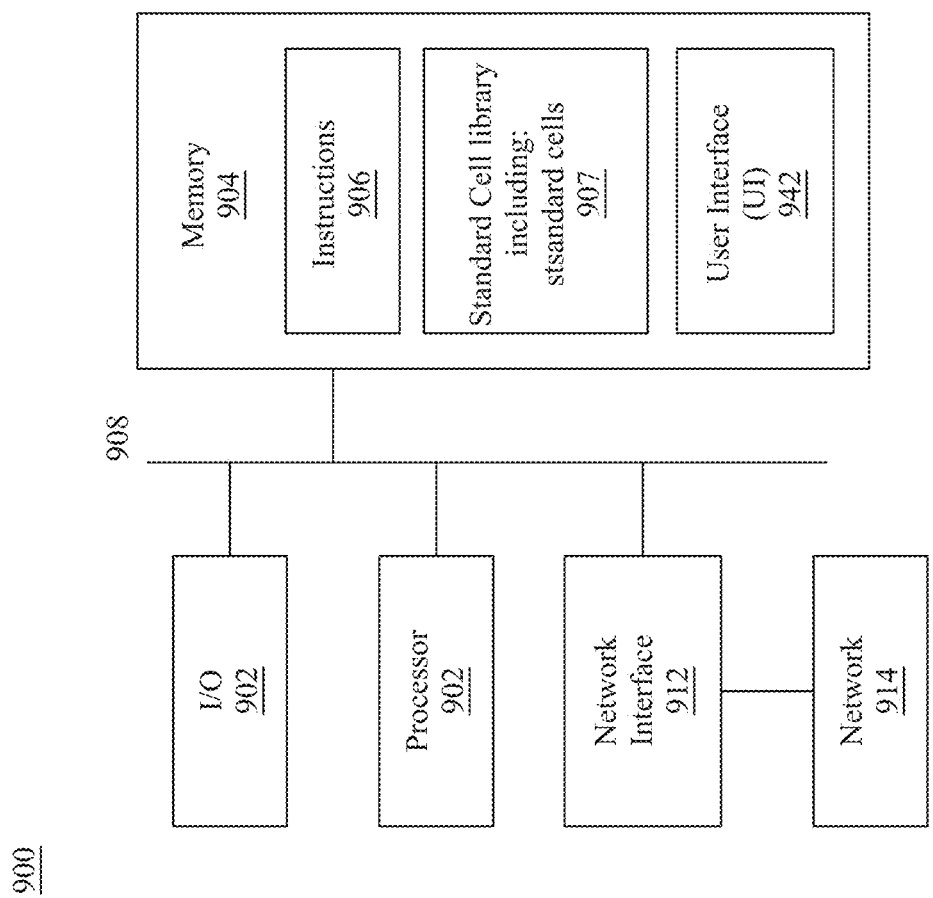
FIG. 9 is a block diagram of an electronic design automation (EDA) system in accordance with some embodiments.

FIG. 9 is a block diagram of an electronic design automation (EDA) system 900 in accordance with some embodiments.

In some embodiments, EDA system 900 includes an APR system. Methods described herein of designing layout diagrams represent wire routing arrangements, in accordance with one or more embodiments, are implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of the methods described herein in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein.

EDA system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

EDA system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
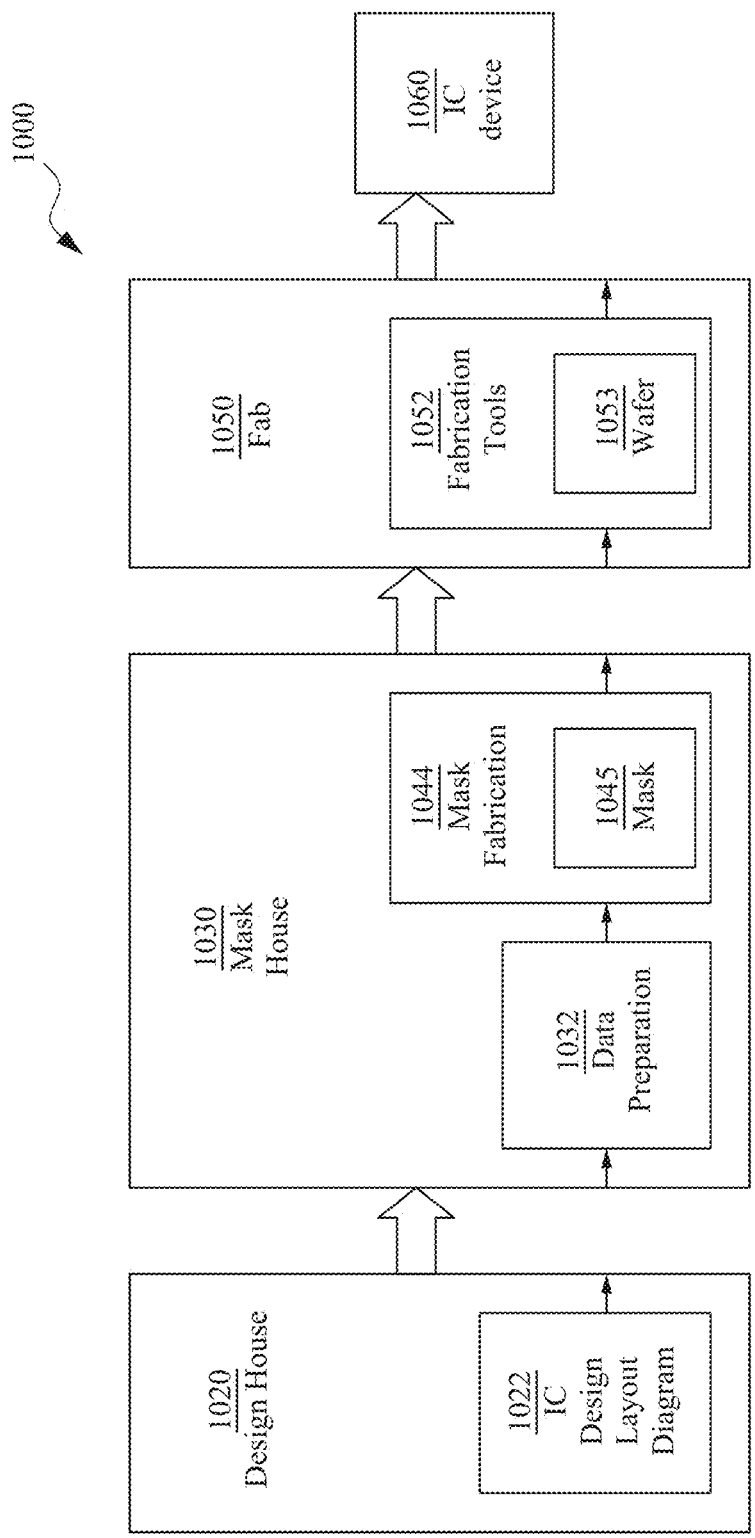
FIG. 10 is a block diagram of an IC device manufacturing system, and an IC manufacturing flow associated therewith, in accordance with some embodiments.

FIG. 10 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 10, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns designed for an IC device 1060. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place-and-route operation. IC design layout diagram 1022 is presented in one or more data files having information of the geometrical patterns. For example, IC design layout diagram 1022 can be expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC device 1060 according to IC design layout diagram 1022. Mask house 1030 performs mask data preparation 1032, where IC design layout diagram 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 10, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 includes fabrication tools 1052 configured to execute various manufacturing operations on semiconductor wafer 1053 such that IC device 1060 is fabricated in accordance with the mask(s), e.g., mask 1045. In various embodiments, fabrication tools 1052 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1050 uses mask(s) 1045 fabricated by mask house 1030 to fabricate IC device 1060. Thus, IC fab 1050 at least indirectly uses IC design layout diagram 1022 to fabricate IC device 1060. In some embodiments, semiconductor wafer 1053 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multilevel interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, an integrated circuit (IC) device comprises at least one circuit comprising an input and an output, and an output connector electrically coupled to the output. The delay circuit further comprises a plurality of transistors electrically coupled with each other between the input and the output. The output is in a first metal layer. The output connector comprises a first conductive pattern in the first metal layer, and a second conductive pattern in a second metal layer different from the first metal layer. The second conductive pattern electrically couples the output to the first conductive pattern.

In an embodiment, an integrated circuit (IC) device comprises a first active region of a first semiconductor type, a second active region of a second semiconductor type different from the first semiconductor type, and a plurality of gate electrodes. The first active region extends discontinuously along a first axis, and comprises first and second portions spaced from each other along the first axis. The second active region extends continuously along the first axis. The second active region overlaps, along a second axis transverse to the first axis, the first and second portions of the first active region and a spacing between the first and second portions of the first active region. The plurality of gate electrodes extends along the second axis and across the first and second active regions.

In an embodiment, an integrated circuit (IC) device comprises a first active region of a first semiconductor type and extending along a first axis, a second active region of a second semiconductor type different from the first semiconductor type and extending along the first axis, and at least one gate electrode extending along a second axis transverse to the first axis and across the first and second active regions. The at least one gate electrode and the first active region are configured as a first transistor of a first type. The at least one gate electrode and the second active region are configured as a second transistor of a second type different from the first type. The IC device further comprises, in or over the first active region, a structure configured to change a stress on the first active region to increase a threshold voltage of the first transistor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device, comprising:
   at least one circuit comprising:
      an input and an output, and
      a plurality of transistors electrically coupled with each other between the input and the output; and
   an output connector electrically coupled to the output, wherein
   the output is in a first metal layer, and
   the output connector comprises:
      a first conductive pattern in the first metal layer, and
      a second conductive pattern in a second metal layer different from the first metal layer, the second conductive pattern electrically coupling the output to the first conductive pattern.

2. The IC device of claim 1, wherein
   the input is in the first metal layer.

3. The IC device of claim 1, wherein
   the plurality of transistors comprises at least one first transistor of a first type, and at least one second transistor of a second type different from the first type,
   the circuit further comprises an extended contact structure over and in electrical contact with both a source/drain of the first transistor and a source/drain of the second transistor, and
   the second conductive pattern overlapping the extended contact structure.

4. The IC device of claim 3, wherein
   the output overlaps the source/drain of one of the first transistor or the second transistor, and
   the second conductive pattern overlaps
      the source/drain of the other of the first transistor and the second transistor, or
      an intermediate region between the source/drain of the first transistor and the source/drain of the second transistor.

5. The IC device of claim 1, wherein
   the at least one circuit comprises a plurality of circuits electrically coupled in series, with an output of a preceding circuit among the plurality of circuits being electrically coupled to an input of a succeeding circuit among the plurality of circuits.

6. The IC device of claim 1, wherein
   the plurality of transistors comprises first and second transistors of a first type, and third and fourth transistors of a second type different from the first type,
   gates of the first through fourth transistors are electrically coupled to the input,
   the first and third transistors are electrically coupled in series between a first node of a first power supply voltage and a second node of a second power supply voltage,
   a source/drain of the first transistor and a source/drain of the third transistor are electrically coupled to a third node, and
   the second and fourth transistors are electrically coupled in parallel between the third node and the output.

7. The IC device of claim 6, wherein
   the plurality of transistors further comprises at least one fifth transistor electrically coupled in series with the first and third transistors between the first node and the second node, and
   a gate of the at least one fifth transistor is electrically coupled to the input.

8. The IC device of claim 1, further comprising:
   a first active region of a first semiconductor type, wherein
      the first active region extends discontinuously along a first axis, and
      the first active region comprises first and second portions spaced from each other along the first axis;
   a second active region of a second semiconductor type different from the first semiconductor type, wherein
      the second active region extends continuously along the first axis, and
      the second active region overlaps, along a second axis transverse to the first axis, the first and second portions of the first active region and a spacing between the first and second portions of the first active region; and
   first through third gate electrodes extending along the second axis and over the second active region, wherein
      the first gate electrode is over the first portion of the first active region,
      the second gate electrode is over the second portion of the first active region, and
      the third gate electrode is over the spacing between the first and second portions of the first active region,
   wherein
   the plurality of transistors comprises:
      first and second transistors of a first type, and
      third through fifth transistors of a second type different from the first type,
   the first gate electrode and the first portion of the first active region are configured as the first transistor,
   the second gate electrode and the second portion of the first active region are configured as the second transistor, and
   the first through third gate electrodes and the second active region are correspondingly configured as the third through fifth transistors.

9. The IC device of claim 8, further comprising:
   a dummy gate electrode extending along the second axis, over the second active region and over the spacing between the first and second portions of the first active region.

10. The IC device of claim 1, wherein
    the plurality of transistors comprises a first transistor,
    the circuit further comprises a plurality of via structures over and in electrical contact with a gate electrode of the first transistor, and
    the plurality of via structures comprises at least one via structure which is free of direct electrical contact with a conductive element other than the gate electrode.

11. An integrated circuit (IC) device, comprising:
    a first active region of a first semiconductor type, wherein
       the first active region extends discontinuously along a first axis, and
       the first active region comprises first and second portions spaced from each other along the first axis;
    a second active region of a second semiconductor type different from the first semiconductor type, wherein
       the second active region extends continuously along the first axis, and
       the second active region overlaps, along a second axis transverse to the first axis, the first and second portions of the first active region and a spacing between the first and second portions of the first active region; and a plurality of gate electrodes extending along the second axis and across the first and second active regions.

12. The IC device of claim 11, wherein
the plurality of gate electrodes comprises first through third gate electrodes extending along the second axis and over the second active region, wherein
the first gate electrode is over the first portion of the first active region,
the second gate electrode is over the second portion of the first active region, and
the third gate electrode is over the spacing between the first and second portions of the first active region,
wherein
the first gate electrode and the first portion of the first active region are configured as a first transistor of a first type,
the second gate electrode and the second portion of the first active region are configured as a second transistor of the first type, and
the first through third gate electrodes and the second active region are correspondingly configured as third through fifth transistors of a second type different from the first type.

13. The IC device of claim 12, wherein
the plurality of gate electrodes further comprises a dummy gate electrode extending along the second axis, over the second active region and over the spacing between the first and second portions of the first active region.

14. The IC device of claim 11, wherein
the first active region further comprises
a third portion opposite the first portion along the first axis, and
a plurality of second portions including the second portion,
the plurality of second portions are arranged along the first axis between the first and third portions,
the plurality of second portions are spaced from each other and from the first and third portions by a plurality of spacings including the spacing between the first and second portions, and
the second active region extends continuously along the first axis to overlap, along the second axis, the first portion, the plurality of second portions, the third portion, and the plurality of spacings.

15. The IC device of claim 14, wherein, along the first axis,
a first length of each of the first and third portions is greater than a second length of each of the plurality of second portions, and
the second length of each of the plurality of second portions is greater than a third length of each of the plurality of spacings.

16. The IC device of claim 11, wherein
the plurality of gate electrodes and the first and second portions of the first active region are configured as a plurality of transistors of a first type,
the plurality of gate electrodes and the second active region are configured as a plurality of transistors of a second type different from the first type,
the plurality of transistors of the first type and the plurality of transistors of the second type are electrically coupled into a plurality of circuits electrically coupled in series, with an output of a preceding circuit among the plurality of circuits being electrically coupled to an input of a succeeding circuit among the plurality of circuits.

17. The IC device of claim 11, further comprising:
a plurality of via structures over and in electrical contact with a gate electrode among the plurality of gate electrodes,
wherein the plurality of via structures comprises at least one via structure which is free of direct electrical contact with a conductive element other than the gate electrode.

18. An integrated circuit (IC) device, comprising:
a first active region of a first semiconductor type and extending along a first axis;
a second active region of a second semiconductor type different from the first semiconductor type, and extending along the first axis; and
at least one gate electrode extending along a second axis transverse to the first axis, and across the first and second active regions,
wherein
the at least one gate electrode and the first active region are configured as a first transistor of a first type,
the at least one gate electrode and the second active region are configured as a second transistor of a second type different from the first type, and
the IC device further comprises, in or over the first active region, a structure configured to change a stress on the first active region to increase a threshold voltage of the first transistor.

19. The IC device of claim 18, wherein
the structure comprises at least one via structure which is over and in electrical contact with a gate electrode of the at least one gate electrode, but is free of direct electrical contact with a conductive element other than the gate electrode, the at least one via structure over the first active region.

20. The IC device of claim 19, further comprising:
a further via structure over and in electrical contact with the gate electrode, and electrically coupled to an input of a circuit in which the first transistor and the second transistor are electrically coupled together.

* * * * *